US012581515B2

(12) United States Patent
Ji et al.

(10) Patent No.: US 12,581,515 B2
(45) Date of Patent: Mar. 17, 2026

(54) INFORMATION TRANSMISSION METHOD, RESOURCE DETERMINATION METHOD AND APPARATUSES

(71) Applicant: 1FINITY Inc., Kawasaki (JP)

(72) Inventors: Pengyu Ji, Beijing (CN); Jian Zhang, Beijing (CN); Lei Zhang, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 428 days.

(21) Appl. No.: 18/104,338

(22) Filed: Feb. 1, 2023

(65) Prior Publication Data

US 2023/0171796 A1     Jun. 1, 2023

Related U.S. Application Data

(63) Continuation of application No. PCT/CN2020/107551, filed on Aug. 6, 2020.

(51) Int. Cl.
*H04W 72/40*      (2023.01)
*H04W 72/25*      (2023.01)
(Continued)

(52) U.S. Cl.
CPC ........... *H04W 72/40* (2023.01); *H04W 72/25* (2023.01); *H04W 72/542* (2023.01); *H04W 72/566* (2023.01)

(58) Field of Classification Search
None
See application file for complete search history.

(56) References Cited

U.S. PATENT DOCUMENTS

2018/0279275 A1   9/2018   Chen et al.
2020/0045674 A1   2/2020   Tseng et al.
(Continued)

FOREIGN PATENT DOCUMENTS

CN     109845373 A    6/2019
CN     110831174 A    2/2020
(Continued)

OTHER PUBLICATIONS

International Search Report issued by the China National Intellectual Property Administration for corresponding International Patent Application No. PCT/CN2020/107551, mailed on Apr. 30, 2021, with an English translation.
(Continued)

*Primary Examiner* — Marcus Smith
*Assistant Examiner* — Rowan K Fakhro
(74) *Attorney, Agent, or Firm* — Myers Wolin, LLC

(57) ABSTRACT

An information transmission method, a resource determination method and apparatuses thereof. The information transmission method includes: determining a second resource set by a second UE according to a first transmission priority; and transmitting assistance information by the second UE to a first UE, the assistance information including time frequency domain information of resources in the second resource set, and the second resource set being used by the first UE for determining a first candidate resource set for transmitting first sidelink data, wherein the first transmission priority is determined according to a priority of the first sidelink data transmitted by the first UE.

5 Claims, 12 Drawing Sheets

301

The second UE determines a second resource set according to a first transmission priority

302

The second UE transmits assistance information to a first UE, the assistance information including time frequency domain information of resources in the second resource set, and the second resource set being used by the first UE for determining a first candidate resource set for transmitting first sidelink (SL) data, wherein the first transmission priority is determined according to a priority of the first sidelink (SL) data transmitted by the first UE

(51) Int. Cl.
    *H04W 72/542*     (2023.01)
    *H04W 72/566*     (2023.01)

(56)         References Cited

U.S. PATENT DOCUMENTS

| | | | | |
|---|---|---|---|---|
| 2020/0351136 | A1* | 11/2020 | Hwang | H04W 56/00 |
| 2021/0185645 | A1 | 6/2021 | Huang et al. | |
| 2022/0030575 | A1* | 1/2022 | Farag | H04L 5/0053 |
| 2022/0159620 | A1 | 5/2022 | Yang | |
| 2022/0346118 | A1* | 10/2022 | Wu | H04L 5/0044 |
| 2023/0049307 | A1 | 2/2023 | Liu et al. | |

FOREIGN PATENT DOCUMENTS

| | | | |
|---|---|---|---|
| CN | 115428545 | A | 12/2022 |
| EP | 3 634 058 | A1 | 4/2020 |
| EP | 4 169 318 | A0 | 1/2022 |
| EP | 4 132 141 | A1 | 2/2023 |
| WO | 2019/096275 | A1 | 5/2019 |
| WO | 2020/033088 | A1 | 2/2020 |
| WO | 2020/145679 | A1 | 7/2020 |
| WO | 2022/019714 | A1 | 1/2022 |

OTHER PUBLICATIONS

LG Electronics, Inc., "Discussion on assistance information for resource allocation in NR SL", Agenda Item: 6.4.2, 3GPP TSG-RAN WG2 Meeting #108, R2-1915513, resubmission of R2-1913886, Reno, USA, Nov. 18-22, 2019.

Huawei et al., "On Sidelink enhancement", Agenda Item: 8.5, 3GPP TSG-RAN WG1 Meeting #101-e, R1-2004602, E-meeting, May 25-Jun. 5, 2020.

Media Tek Inc., "On Sidelink Resource Allocation Mechanism", Agenda Item: 7.2.4.1.4, 3GPP TSG-RAN WG1 Meeting #95, R1-1812367, Spokane, USA, Nov. 12-16, 2018.

LG Electronics, "Discussion on resource allocation mechanism for NR V2X", Agenda Item: 7.2.4.1.4, 3GPP TSG-RAN WG1 Meeting #95, R1-1812844, Spokane, USA, Nov. 12-16, 2018.

Intel Corporation, "QoS Management and Congestion Control for NR V2X Sidelink Communication", Agenda Item: 7.2.4.4, 3GPP TSG-RAN WG1 Meeting #95, R1-1812495, Spokane, USA, Nov. 12-16, 2018.

Intel Corporation, "On QoS Management for NR V2X Communication", Agenda Item: 7.2.4.4, 3GPP TSG-RAN WG1 Meeting #94bis, R1-1810780, Chengdu, China, Oct. 8-12, 2018.

LG Electronics, "New WID on NR sidelink enhancement", Agenda Item: 9.1.1, 3GPP TSG-RAN Meeting #86, RP-193231 (revision of RP-193134), Sitges, Spain, Dec. 9-12, 2019.

3gpp TS 38.213 V16.2.0, "3rd Generation Partnership Project; Technical Specification Group Radio Access Network; NR; Physical layer procedures for control (Release 16)", Jun. 2020.

Communication pursuant to Rule 164(1) EPC with the partial supplementary European search report and Provisional Opinion, issued by the European Patent Office for corresponding European Patent Application No. 20948213.2-1215, mailed on Aug. 22, 2023.

The First Examination Report issued by the Indian Patent Office for corresponding Indian Patent Application No. 202337004951, mailed on Mar. 11, 2024, with an English translation.

First Notification of Office Action and Search Report issued by the China National Intellectual Property Administration for corresponding Chinese Patent Application No. 202080104435.4, mailed on Dec. 24, 2024, with an English translation.

Notice of Reasons for Refusal issued by the Japan Patent Office for corresponding Japanese Patent Application No. 2023-506561, mailed on Dec. 19, 2023 with an English translation.

* cited by examiner

Figure 3:
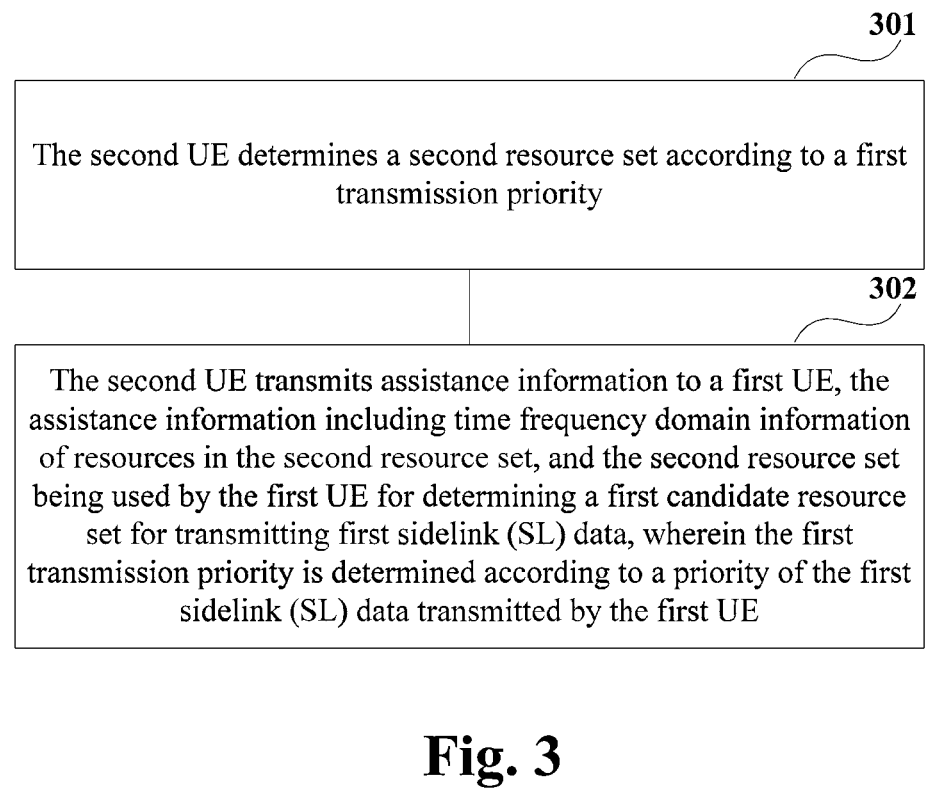

301

The second UE determines a second resource set according to a first transmission priority

302

The second UE transmits assistance information to a first UE, the assistance information including time frequency domain information of resources in the second resource set, and the second resource set being used by the first UE for determining a first candidate resource set for transmitting first sidelink (SL) data, wherein the first transmission priority is determined according to a priority of the first sidelink (SL) data transmitted by the first UE

Figure 4:
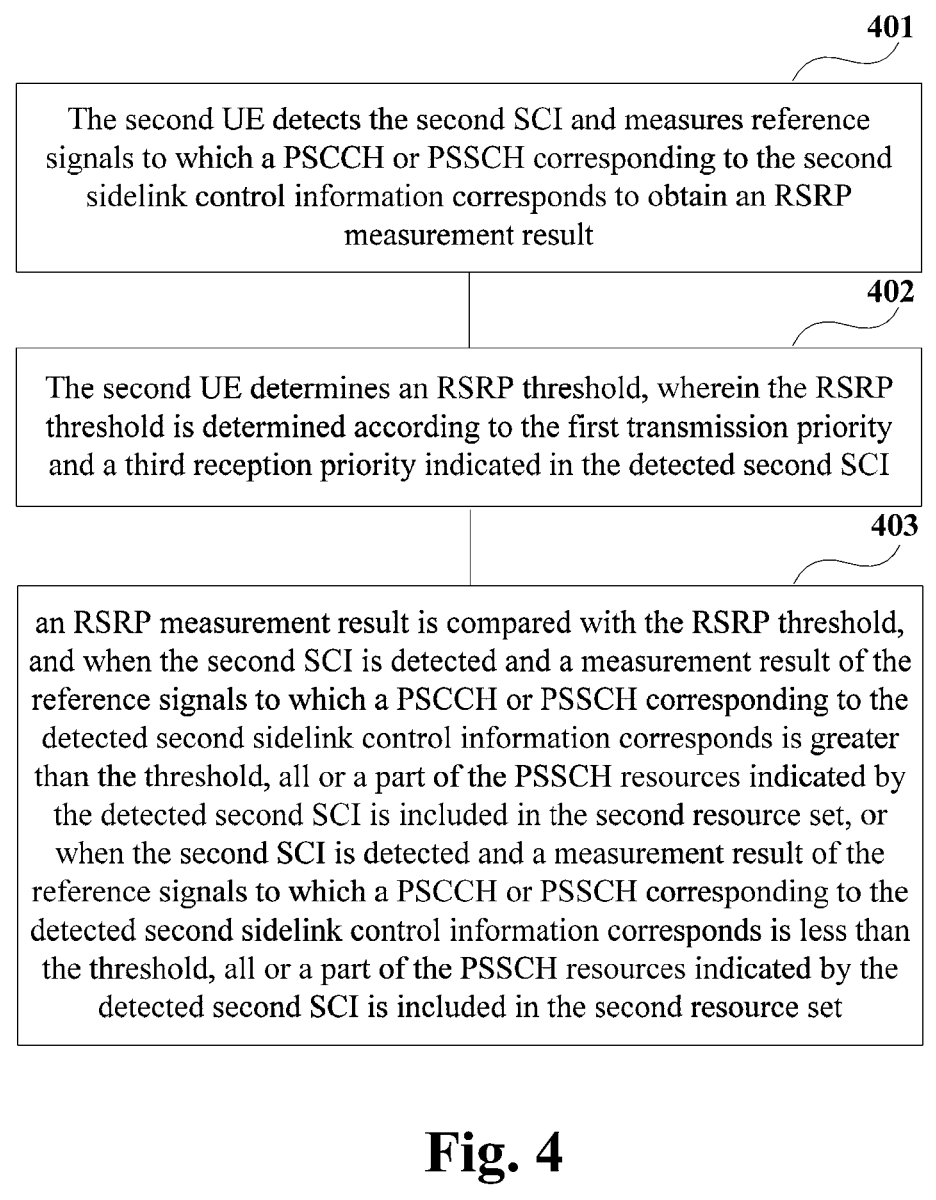

The second UE detects the second SCI and measures reference signals to which a PSCCH or PSSCH corresponding to the second sidelink control information corresponds to obtain an RSRP measurement result

402

The second UE determines an RSRP threshold, wherein the RSRP threshold is determined according to the first transmission priority and a third reception priority indicated in the detected second SCI

403 an RSRP measurement result is compared with the RSRP threshold, and when the second SCI is detected and a measurement result of the reference signals to which a PSCCH or PSSCH corresponding to the detected second sidelink control information corresponds is greater than the threshold, all or a part of the PSSCH resources indicated by the detected second SCI is included in the second resource set, or when the second SCI is detected and a measurement result of the reference signals to which a PSCCH or PSSCH corresponding to the detected second sidelink control information corresponds is less than the threshold, all or a part of the PSSCH resources indicated by the detected second SCI is included in the second resource set

Figures 5, 6:
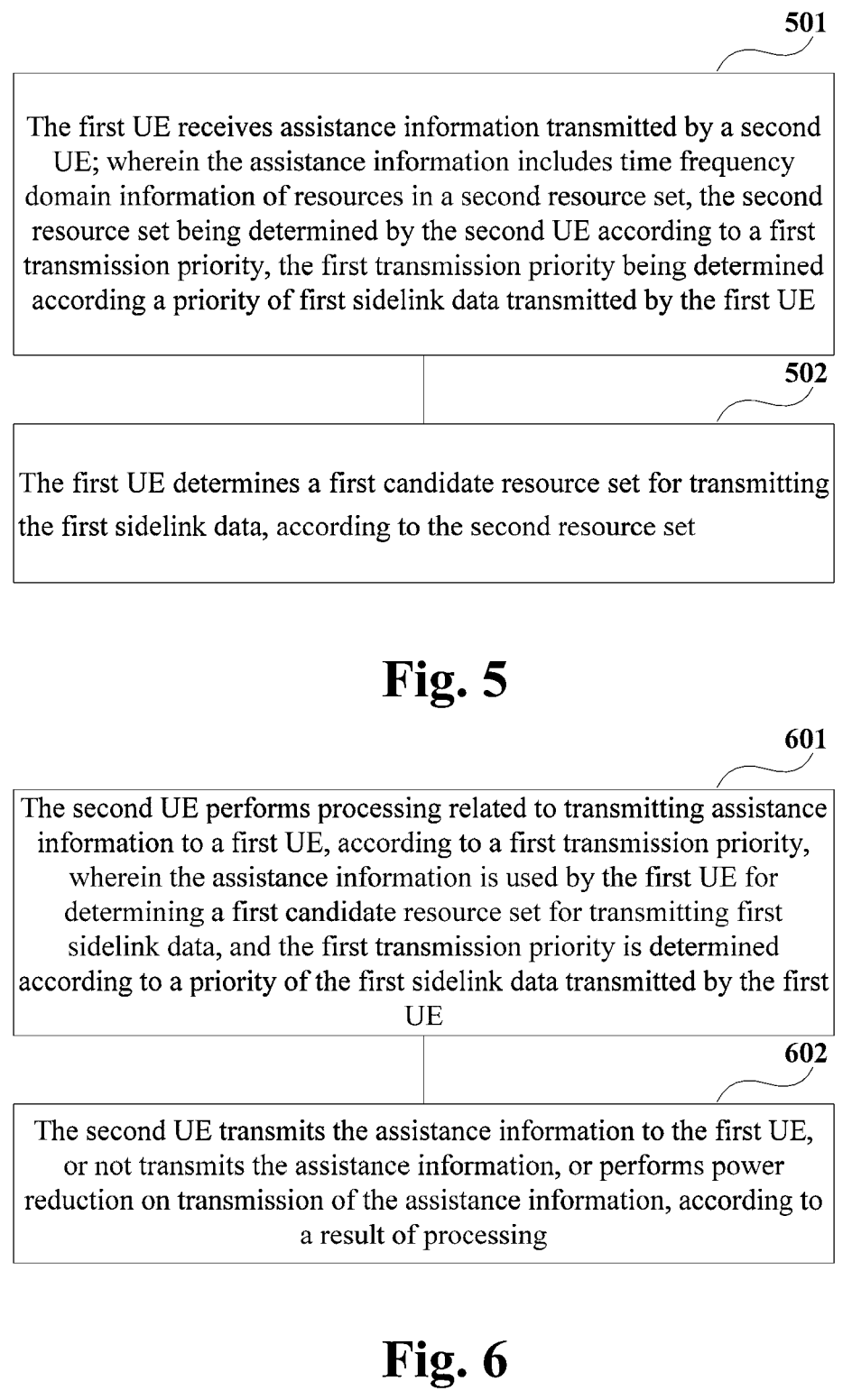

The first UE receives assistance information transmitted by a second UE; wherein the assistance information includes time frequency domain information of resources in a second resource set, the second resource set being determined by the second UE according to a first transmission priority, the first transmission priority being determined according a priority of first sidelink data transmitted by the first UE

502

The first UE determines a first candidate resource set for transmitting the first sidelink data, according to the second resource set

The second UE performs processing related to transmitting assistance information to a first UE, according to a first transmission priority, wherein the assistance information is used by the first UE for determining a first candidate resource set for transmitting first sidelink data, and the first transmission priority is determined according to a priority of the first sidelink data transmitted by the first UE

602

The second UE transmits the assistance information to the first UE, or not transmits the assistance information, or performs power reduction on transmission of the assistance information, according to a result of processing

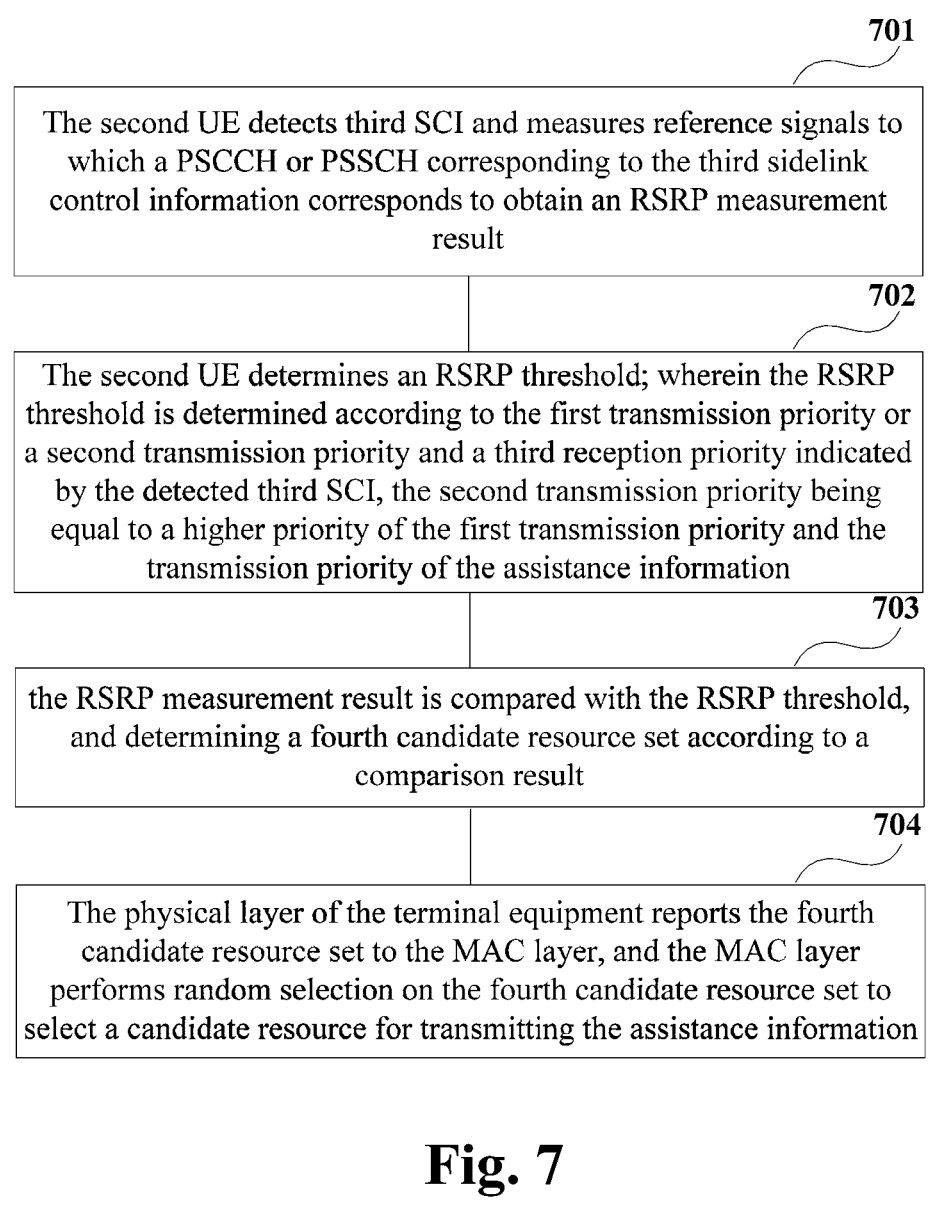

The second UE detects third SCI and measures reference signals to which a PSCCH or PSSCH corresponding to the third sidelink control information corresponds to obtain an RSRP measurement result

702

The second UE determines an RSRP threshold; wherein the RSRP threshold is determined according to the first transmission priority or a second transmission priority and a third reception priority indicated by the detected third SCI, the second transmission priority being equal to a higher priority of the first transmission priority and the transmission priority of the assistance information

703 the RSRP measurement result is compared with the RSRP threshold, and determining a fourth candidate resource set according to a comparison result

704

The physical layer of the terminal equipment reports the fourth candidate resource set to the MAC layer, and the MAC layer performs random selection on the fourth candidate resource set to select a candidate resource for transmitting the assistance information

Fig. 7

801 a channel occupancy ratio threshold is determined corresponding to the first transmission priority or the second transmission priority and the channel busy ratio value that is obtained by current measurement

802 congestion control is performed according to the channel occupancy ratio threshold

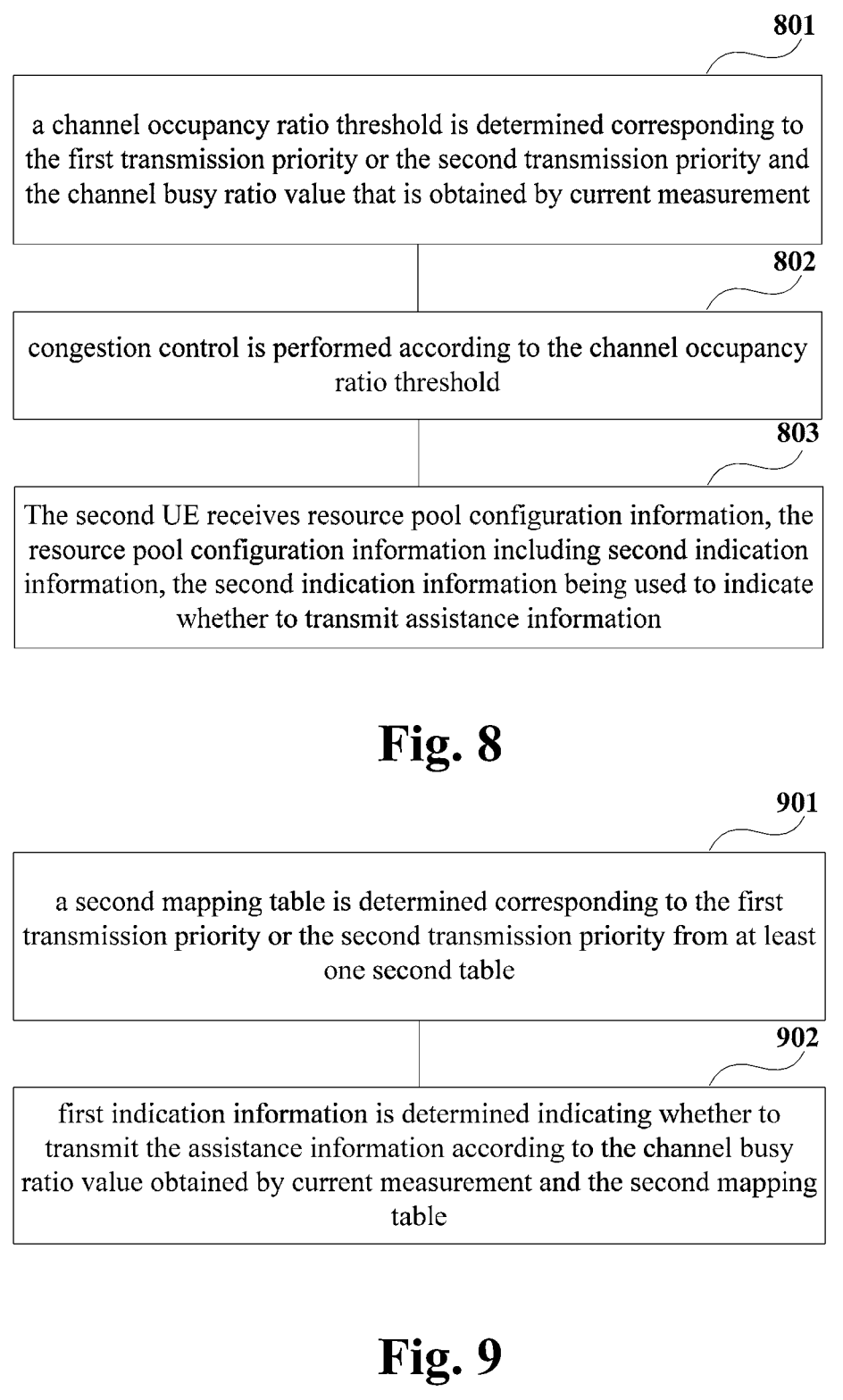

803

The second UE receives resource pool configuration information, the resource pool configuration information including second indication information, the second indication information being used to indicate whether to transmit assistance information

Fig. 8

901 a second mapping table is determined corresponding to the first transmission priority or the second transmission priority from at least one second table

902 first indication information is determined indicating whether to transmit the assistance information according to the channel busy ratio value obtained by current measurement and the second mapping table

The fourth UE receives the assistance information transmitted by the second UE, wherein the assistance information includes time-frequency domain information of resources in a second resource set, the second resource set being determined by the second UE according to a first transmission priority, the first transmission priority being determined according to a priority of first sidelink data transmitted by the first UE

1002

The fourth UE transmits the assistance information to the first UE

Fig. 10

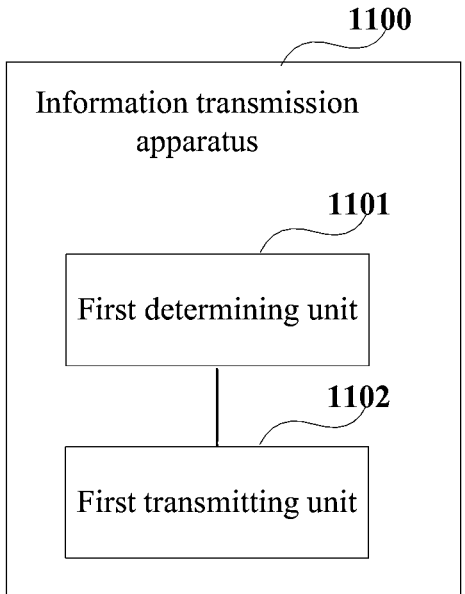

1100

Information transmission apparatus

1101

First determining unit

1102

First transmitting unit

INFORMATION TRANSMISSION METHOD, RESOURCE DETERMINATION METHOD AND APPARATUSES

CROSS-REFERENCE TO RELATED APPLICATION

This application is a continuation application of International Application PCT/CN2020/107551 filed on Aug. 6, 2020 and designated the U.S., the entire contents of which are incorporated herein by reference.

TECHNICAL FIELD

This disclosure relates to the field of communication technologies.

BACKGROUND

For technologies related to vehicle communications, including V2X (Vehicle to Everything), and P2X (Pedestrian to Everything), etc. (hereinafter referred to as V2X), a transmitting device may directly communicate with a receiving device via a sidelink. Currently, both LTE (Long Term Evolution) and New Radio (NR) systems support V2X communications, that is, LTE V2X and NR V2X.

The transmitting device in the sidelink may autonomously select time-frequency resources for information transmission based on a sensing result. The sensing includes monitoring SCI, measuring reference signal received power (RSRP) and measuring received signal strength indicator (RSSI). By sensing, resources that have been reserved by other devices may be avoided during resource selection, hence, sidelink transmission collisions with other devices may be avoided, thereby avoiding interference.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

In a current NR V2X, resource collisions may occur due to a limited sensing range of a terminal equipment (UE), thereby reducing reliability. Therefore, performances of services with higher requirement on reliabilities will be affected. Currently, an enhanced mechanism is proposed to reduce collision probability and increase reliability.

FIG. 1 is a schematic diagram of an application scenario of the above enhancement mechanism. As shown in FIG. 1, UE B is to transmit data to UE A, and there exists UE C near UE A that UE B is unable to sense. In other words, for UE B, UE C is a "hidden terminal". If both UE B and UE C both need to transmit data, as they are unable to sense each other, it will be resulted that resources selected by UE B may overlap with resources selected by UE C, in this way, interference will occur between data transmitted by UE B and UE C to UE A. Hence, the current enhancement mechanism is that UE A learns resource usage of UE C via a sensing process, adds the resource usage of UE C to assistance information and transmits it to UE B, and UE B is able to exclude resource sets occupied by UE C or UEs around UE C detected by UE C during the resource selection process, thereby reducing a probability of collision and increasing the reliability. However, currently no method is proposed of how to determine a resource set sensed within the assistance information and how to transmit the assistance information.

Addressed to at least one of the above problems, embodiments of this disclosure provide an information transmission method and apparatus.

According to an aspect of the embodiments of this disclosure, there is provided an information transmission method, including:

determining a second resource set by a second UE according to a first transmission priority; and transmitting assistance information by the second UE to a first UE, the assistance information including time frequency domain information of resources in the second resource set, and the second resource set being used by the first UE for determining a first candidate resource set for transmitting first sidelink data, wherein the first transmission priority is determined according to a priority of the first sidelink data transmitted by the first UE.

According to another aspect of the embodiments of this disclosure, there is provided an information transmission apparatus, applicable to a second UE, the apparatus including:

a first determining unit configured to determine a second resource set according to a first transmission priority; and a first transmitting unit configured to transmit assistance information to a first UE, the assistance information comprising time frequency domain information of resources in the second resource set, and the second resource set being used by the first UE for determining a first candidate resource set for transmitting first sidelink data, wherein the first transmission priority is determined according to a priority of the first sidelink data transmitted by the first UE.

According to a further aspect of the embodiments of this disclosure, there is provided a resource determination method, including:

receiving, by a first UE, assistance information transmitted by a second UE; wherein the assistance information comprises time frequency domain information of resources in a second resource set, the second resource set being determined by the second UE according to a first transmission priority, the first transmission priority being determined according a priority of first sidelink data transmitted by the first UE; and determining by the first UE according to the second resource set, a first candidate resource set for transmitting the first sidelink data.

According to still another aspect of the embodiments of this disclosure, there is provided a resource determination apparatus, applicable to a first UE, the apparatus including:

a first receiving unit configured to receive assistance information transmitted by a second UE; wherein the assistance information comprises time frequency domain information of resources in a second resource set, the second resource set being determined by the second UE according to a first transmission priority, the first transmission priority being determined according a priority of first sidelink data transmitted by the first UE; and a second determining unit configured to determine a first candidate resource set for transmitting the first sidelink data, according to the second resource set.

According to yet another aspect of the embodiments of this disclosure, there is provided an information transmission method, including:

performing by a second UE according to a first transmission priority, processing related to transmitting assistance information to a first UE; wherein the assistance information is used by the first UE for determining a first candidate resource set for transmitting first sidelink data, and the first transmission priority is determined according a priority of the first sidelink data transmitted by the first UE; and transmitting the assistance information to the first UE, or not transmitting the assistance information, or performing power reduction on transmission of the assistance information, by the second UE according to a result of processing.

According to yet still another aspect of the embodiments of this disclosure, there is provided an information transmission apparatus, applicable to a second UE, the apparatus including:

a first processing unit configured to perform processing related to transmitting assistance information to a first UE according to a first transmission priority, wherein the assistance information is used by the first UE for determining a first candidate resource set for transmitting first sidelink data, and the first transmission priority is determined according a priority of the first sidelink data transmitted by the first UE; and a second processing unit configured to transmit the assistance information to the first UE, or not to transmit the assistance information, or perform power reduction on transmission of the assistance information, according to a result of processing.

An advantage of the embodiments of this disclosure exists in that the terminal equipment does not determine the resource set sensed in the assistance information or perform processing of transmitting assistance information to the peer terminal equipment according to the priority of the data to be transmitted by the terminal equipment itself, but determines the resource set sensed in the assistance information or performs processing of transmitting assistance information to the peer terminal equipment according to the priority of the data transmitted by the peer terminal equipment determining transmission data resources by using the assistance information. Hence, the resource set sensed in the assistance information may be determined by taking the services transmitted by the peer terminal equipment into account and the assistance information may be transmitted, so that the assistance information may more efficiently assist the peer terminal equipment in transmitting services.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiments.

FIG. 3 is a schematic diagram of the information transmission method of an embodiment of this disclosure;

FIG. 4 is a schematic diagram of an implementation of operation 301 of the embodiment of this disclosure;

FIG. 5 is a schematic diagram of the resource determination method of an embodiment of this disclosure;

FIG. 6 is a schematic diagram of the information transmission method of an embodiment of this disclosure;

FIG. 7 is a schematic diagram of an implementation of operation 601 of the embodiment of this disclosure;

FIG. 8 is a schematic diagram of an implementation of operation 601 of the embodiment of this disclosure;

FIG. 9 is a schematic diagram of an implementation of operation 601 of the embodiment of this disclosure;

FIG. 10 is a schematic diagram of the information transmission method of an embodiment of this disclosure;

FIG. 11 is a schematic diagram of the information transmission apparatus of an embodiment of this disclosure;

DETAILED DESCRIPTION

Figure 1:
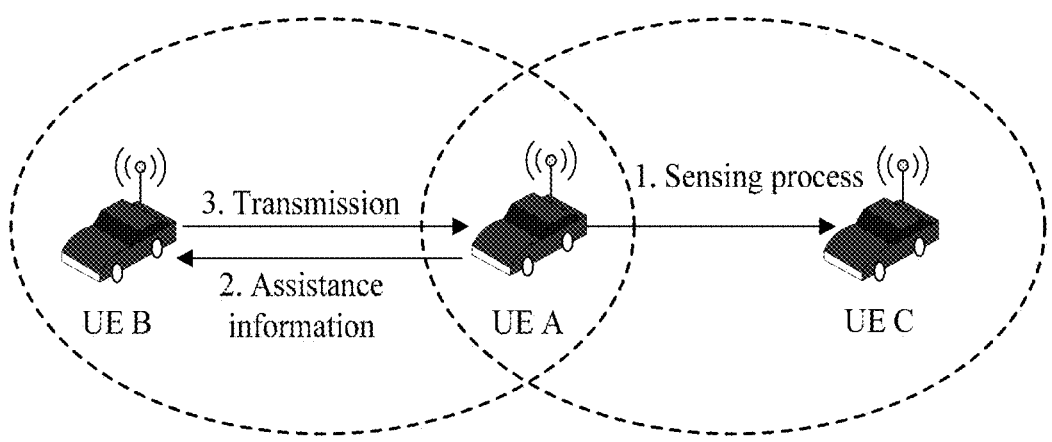
FIG. 1 is schematic diagram of a scenario of an enhancement mechanism of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station or a core network device, and may include one or more network devices described above. The term "user side" or "terminal side" or "terminal equipment side" refers to a side of a user or a terminal, which may be a UE, and may include one or more terminal equipments described above. "Device" may refer to a network device, or may refer to a terminal equipment.

Scenarios in the embodiments of this disclosure shall be described below by way of examples; however, this disclosure is not limited thereto.

Figure 2:
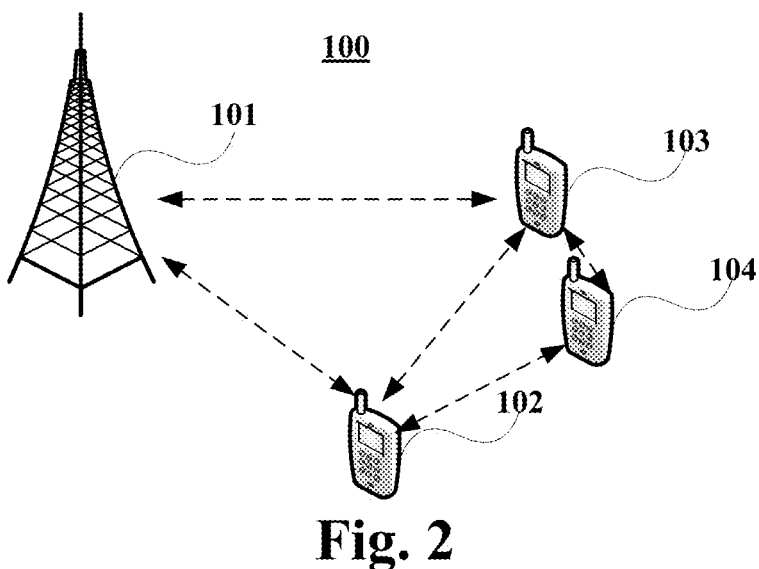
FIG. 2 is schematic diagram of a communication system of an embodiment of this disclosure.

FIG. 2 is schematic diagram of a communication system of an embodiment of this disclosure, in which a case where terminal equipments and a network device are taken as examples is schematically shown. As shown in FIG. 2, the communication system 100 may include a network device 101 and terminal equipments 102, 103, 104. For the sake of simplicity, an example having only three terminal equipments and one network device is schematically given in FIG. 2; however, the embodiments of this disclosure is not limited thereto.

In the embodiments of this disclosure, existing services or services that may be implemented in the future may be performed between the network device 101 and the terminal equipments 102, 103. For example, such services may include but not limited to an enhanced mobile broadband (eMBB), massive machine type communication (mMTC), ultra-reliable and low-latency communication (URLLC), and related communications of reduced capability terminal equipments, etc.

It should be noted that FIG. 2 shows that three terminal equipments 102, 103, 104 are all within coverage of the network device 101. However, this disclosure is not limited thereto, and the three terminal equipments 102, 103, 104 may not be within the coverage of the network device 101, or one terminal equipment 102 is within the coverage of the network device 101 and the other terminal equipments 103, 104 are outside the coverage of the network device 101.

In the embodiments of this disclosure, sidelink transmission may be performed between the terminal equipments 102, 103 and 104. For example, the terminal equipments 102, 103 and 104 may all perform sidelink transmission within coverage of the network device 101 to achieve V2X communications, or they may all perform sidelink transmission outside the coverage of the network device 101 to achieve V2X communications, or may perform sidelink transmission to achieve V2X communications when the terminal equipment 102 is within the coverage of the network device 101 while the terminal equipments 103 and 104 are outside the coverage of the network device 101.

In the embodiments of this disclosure, the terminal equipment(s) 102 and/or 103 and/or 104 may autonomously select sidelink resources (i.e. in mode 2), in which case the sidelink transmission may be not related to the network device 101, that is, the network device 101 is optional. Of course, autonomously selecting sidelink resources (i.e. in mode 2) may be combined with allocating sidelink resources by the network device (i.e. in mode 1) in the embodiment of this disclosure; however, the embodiments of this disclosure is not limited thereto.

In the embodiments of this disclosure, the time unit may be a subframe, a slot or a set containing at least one time domain symbol. The set of at least one time domain symbol may also be referred to as a mini slot or a non-slot. For example, the subframe and slot in the embodiments of this disclosure may be used interchangeably, and "a slot" may also be replaced with "a subframe", and this disclosure is not limited thereto, and it may also be replaced with other time units. In addition, the terms "a time-frequency resource" and "a resource" may be used interchangeably.

In the embodiments of this disclosure, a sidelink shall be described by taking "V2X" or "P2X" as an example; however, this disclosure is not limited thereto, and it is also applicable to other sidelink scenarios than "V2X" or "P2X".

In the following description, without causing confusion, the terms "sidelink" and "V2X" or "P2X" may be interchangeable, the terms "a PSFCH" and "a sidelink feedback channel" may be interchangeable, the terms "a PSCCH" and "a sidelink control channel" or "sidelink control information" may be interchangeable, and the terms "a PSSCH" and "a sidelink data channel" or "sidelink data" may also be interchangeable.

In addition, transmitting or receiving a PSSCH may be understood as transmitting or receiving sidelink data carried by the PSSCH, and transmitting or receiving a PSFCH may be understood as transmitting or receiving sidelink feedback information carried by the PSFCH.

Currently, a terminal equipment may obtain sidelink transmission resources in a process of sensing detection+resource selection, in which sensing may be continuously performed to obtain occupancy of resources in a resource pool. For example, the terminal equipment may estimate resource occupancy in a later period of time (referred to as a selection window) according to resource occupancy in a former period of time (referred to as a sensing window).

For example, the terminal equipment may obtain resource occupancy of a sensing window by detecting sidelink control information (SCI) in an (n−1000)-th to an (n−1)-th subframes or slots (i.e. sensing windows) and time-frequency resource reference signals at different positions, thereby estimating resource occupancy of an (n+T1)-th to (n+T2)-th subframes or slots (i.e. selection windows). The above sensing includes monitoring SCI, and measuring reference signal received power RSRP, etc. There are many equivalent expressions for monitoring SCI in a time unit, such as monitoring a time unit, receiving SCI in a time unit, detecting SCI in a time unit, and blindly detecting SCI in a time unit, etc. The SCI may be SCI in LTE V2X, or may be 1st stage SCI (SCI format 1A) in NR V2X; however, this disclosure is not limited thereto. The process of sensing detection+resource selection includes:

for example, step 1: a physical layer obtains a candidate resource set when there exist sidelink data to be transmitted, a physical layer of a terminal equipment obtains a granularity $R_{x,y}$ of resource selection from a higher layer (such as a media access control (MAC) layer); this granularity may denote a series of continuous subchannels within a subframe, each subchannel includes more than one continuous physical resource blocks (PRBs), the number of PRBs may be determined by the resource pool, and the resource pool may be configured by a network device (such as a base station), or may be preconfigured; and a set of $R_{x,y}$-sized resources (hereinafter referred to as $R_{x,y}$ candidate resources) in all subframes in the entire selection window is initialized and defined as set A;

the terminal equipment may exclude a part of candidate resources in set A according to a result of detection performed in the sensing window before arrival of the data to be transmitted; for example, following $R_{x,y}$ candidate resources need to be excluded:

all $R_{x,y}$ candidate resources in a subframe that is possibly performed resource reservation in a selection window and corresponds to a subframe transmitted by the terminal equipment in the sensing window;

an $R_{x,y}$ candidate resource in a subframe detected by the terminal equipment in the sensing window, wherein it is detected on the $R_{x,y}$ candidate resource that SCI has reserved a corresponding subframe in a current selection window, an indicated time-frequency domain resource overlaps with the $R_{x,y}$ candidate resource in the time-frequency domain, and a detection result of reference signal received power (RSRP) of a physical sidelink shared channel (PSSCH) to which the SCI corresponds is greater than a threshold (hereinafter referred to as an RSRP threshold), or the SCI has reserved a subframe after the selection window, the subframe is the same subframe in a time domain as one of subsequent subframes that may be reserved by a subframe in the current selection window, the frequency domain resource overlaps with the $R_{x,y}$ candidate resource in the frequency domain, and a detection result of RSRP of a PSSCH to which the SCI corresponds is greater than the RSRP threshold $Th(p_t, p_r)$;

where, $p_t$ in the RSRP threshold $Th(p_t, p_r)$ is a priority of the sidelink transmission to be performed by the terminal equipment, $p_r$ is a priority indicated by an SCI received by the terminal equipment, and $(p_t, p_r)$ is associated with the threshold $Th(p_t, p_r)$;

step 2: an MAC layer selects resources in a candidate resource set the physical layer of the terminal equipment may report set B to the MAC layer, and the MAC layer randomly selects a candidate resource in set B to perform data transmission; and furthermore, it selects a modulation and coding scheme (MCS) to perform data transmission on the selected resource.

Without ambiguity, "exclude", "do not select", "exclude" and "avoid" may be used indiscriminately in the embodiments of this disclosure.

As described in the summary of this disclosure, no method for determining a resource set sensed within assistance information is proposed currently. Address to the above technical problems, embodiments of this disclosure provide a corresponding solution. That is, the embodiments of this disclosure provide an information transmission scheme, wherein when a terminal equipment determines a resource set in assistance information, it may refer to the above-described method for excluding a part of candidate resources in set A in the sensing process, that is, determining the resource set by sending. What is different from the above method is that the priority of the data to be transmitted by the terminal equipment is not used, while a resource set sensed within the assistance information is determined according to a priority of the data transmitted by the peer terminal equipment determining resources for transmitting data by using the assistance information. Hence, the resource set sensed in the assistance information may be determined by taking the services transmitted by the peer terminal equipment into account, so that the assistance information may more efficiently assist the peer terminal equipment in transmitting services. Following description shall be given with reference to an embodiment of a first aspect.

Embodiments of a First Aspect

The embodiments of this disclosure provide an information transmission method, which shall be described from a side of a second terminal equipment (hereinafter referred to as a second UE for the convenience of description). For example, the information transmission method may be executed by a physical layer of the second terminal equipment, which shall not be repeated below any further.

FIG. 3 is a schematic diagram of the information transmission method of the embodiment of this disclosure. As shown in FIG. 3, the method includes:

301: the second UE determines a second resource set according to a first transmission priority; and

302: the second UE transmits assistance information to a first UE, the assistance information including time frequency domain information of resources in the second resource set, and the second resource set being used by the first UE for determining a first candidate resource set for transmitting first sidelink (SL) data, wherein the first transmission priority is determined according to a priority of the first sidelink (SL) data transmitted by the first UE.

It should be noted that FIG. 3 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 3.

In some embodiments, the first SL data refers to a first SL data packet, transmission of the first SL data packet by the first UE includes initial transmission or retransmission, a priority of the first SL data transmitted by the first UE represents a priority of PSSCHs transmitting the first SL data. The priority is indicated by SCI on a PSCCH related to the PSSCH, and the higher a value of the priority, the lower the priority, and vice versa. For example, the value of the priority may be expressed as 0, 1, 2, etc., and 0 means the priority is highest; however, this embodiment is not limited thereto.

In some embodiments, the first SL data may be transmitted by the first UE to the second UE or other UEs; however, this embodiment is not limited thereto.

In some embodiments, that the first transmission priority is determined according to the priority of the first SL data transmitted by the first UE means that the first transmission priority is determined at least according to a priority of the first SL data transmitted by the first UE, that is, it may be determined only according to the priority of the first SL data transmitted by the first UE, and may also be determined according to the priority of the first SL data transmitted by the first UE and priorities of the SL data transmitted by other UEs receiving and using the assistance information.

In some embodiments, when the second UE transmits the assistance information to the first UE and the first UE uses or refers to a second resource set in the assistance information to determine a first candidate resource set for transmitting the first SL data, the first transmission priority is equal to the transmission priority of the first SL data.

In some embodiments, the second UE may not only transmit the assistance information to the first UE, but also transmit the assistance information to other UEs, and the other UEs may also determine candidate resource set for transmitting their respective SL data by using or referring to the second resource set in the assistance information (hereinafter referred to as that the UEs use/refer to the assistance information), that is, the number of UEs using or referring to the assistance information is more than one, and the first transmission priority is determined according to the transmission priority of the first SL data and the transmission priorities of their respective SL data transmitted by the other UEs. For example, the first transmission priority is equal to a highest priority of the transmission priority of the first SL data and the transmission priorities of their respective SL data transmitted by the other UEs.

In some embodiments, the method further includes (not shown in figures, optional):

the second UE transmits the assistance information to a third UE, the second resource set being further used by the third UE to determine a third candidate resource set for transmitting third SL data; wherein the first transmission priority is equal to a higher priority of the transmission priority of the first SL data and a transmission priority of the third SL data. For example, if the priority of the first SL data transmitted by UE1 is 2 and a priority of the third SL data transmitted by UE3 is 3, the first transmission priority is 2.

In some embodiments, the method may further include: the second UE transmits the assistance information to a fourth UE, a fifth UE, and so on. The first transmission priority is equal to a highest priority of the transmission priorities of their respective SL data transmitted by the UEs receiving and using/referring to the assistance information, which shall not be described in this embodiment any further.

In some embodiments, the method may further include (optional, not shown in figures):

the second UE receives first SCI transmitted by the first UE, the first SCI being used to indicate the priority of the first SL data transmitted by the first UE.

In some embodiments, the priority of the first SL data transmitted by the first UE may be indicated by the first SCI before a first time of transmission (initial transmission) of the first SL data, or may be indicated by the first SCI after the first time of transmission (initial transmission) of the first SL data.

For example, the first SCI may be in an existing format or a newly-defined format. For example, the priority of the first SL data transmitted by the first UE is indicated by a priority indication field (an information element is expressed as a priority) in the first SCI.

In some embodiments, the first SCI may further be used to trigger transmission of the assistance information, such as triggering the transmission of the assistance information via a triggering field in the first SCI.

In some embodiments, the second UE determines the second resource set by sensing detection. For example, in a process of sensing detection, the second resource set is determined according to the first transmission priority and a third reception priority. In particular, the second UE according to the first transmission priority and the third reception priority, determines whether all or a part of PSSCH resources indicated by second SCI indicating the third reception priority are included in the second resource set. The second UE will detect one or more pieces of second SCI, and for the one or more pieces of second SCI, according to the first transmission priority and third reception priorities indicated by the second SCI, determine whether all or a part of PSSCH resources indicated by each piece of second SCI are included in the second resource set.

FIG. 4 is a schematic diagram of an implementation of operation 301. As shown in FIG. 4, operation 301 includes:

401: the second UE detects the second SCI and measures reference signals to which a PSCCH or PSSCH corresponding to the second sidelink control information corresponds to obtain an RSRP measurement result;

in some embodiments, the second UE performs blind detection (or monitoring) within a first period of time to detect the second SCI, the first period of time being equivalent to a sensing window. For example, one or more pieces of second SCI may be detected (received), and the second UE may perform RSRP measurement on reference signals to which a PSCCH or PSSCH corresponding to all or a part of the received second sidelink control information corresponds; in some embodiments, the RSRP may be obtained by measuring a demodulation reference signal (DM-RS) of the PSCCH (the second SCI), or may be obtained by measuring a DM-RS of the PSSCH scheduled by the second SCI. Reference may be made to relevant technologies for how to monitor and measure.

In some embodiments, the second SCI may be SCI (such as the above first SCI) transmitted by the above first UE, and/or SCI transmitted by other UEs, and this embodiment is not limited thereto.

402: the second UE determines an RSRP threshold, wherein the RSRP threshold is determined according to the first transmission priority and a third reception priority indicated in the detected second SCI;

in some embodiments, for example, each measured RSRP corresponds to an RSRP threshold $Th(p_t, p_r)$; where, $p_t$ is the first transmission priority, but not a transmission priority of sidelink data to be transmitted of the second UE itself indicated by a higher layer; $p_r$ is the third reception priority indicated by the second SCI received by the terminal equipment; and $(p_t, p_r)$ corresponds to a threshold $Th(p_t, p_r)$, and the correspondence may be configured by a network side, preconfigured or predefined, and reference may be made to relevant technologies for details.

403: an RSRP measurement result is compared with the RSRP threshold, and when the second SCI is detected and a measurement result of the reference signals to which a PSCCH or PSSCH corresponding to the detected second sidelink control information corresponds is greater than the threshold, all or a part of the PSSCH resources indicated by the detected second SCI is included in the second resource set, or when the second SCI is detected and a measurement result of the reference signals to which a PSCCH or PSSCH corresponding to the detected second sidelink control information corresponds is less than the threshold, all or a part of the PSSCH resources indicated by the detected second SCI is included in the second resource set.

For example, the second UE measures the reference signals to which a PSCCH or PSSCH corresponding to one second sidelink control information corresponds to obtain an RSRP measurement result 1, determines RSRP threshold 1 according to the first transmission priority and a third reception priority indicated by the one second SCI, compares RSRP measurement result 1 with RSRP threshold 1, and when measurement result 1 is greater than threshold 1, includes all or a part of PSSCH resources indicated by the one second SCI_1 in the second resource set; and the second UE measures the reference signals to which a PSCCH or PSSCH corresponding to the other second sidelink control information corresponds to obtain an RSRP measurement result 2, determines RSRP threshold 2 according to the first transmission priority and a third reception priority indicated by the other second SCI, compares RSRP measurement result 2 with RSRP threshold 2, and when measurement result 2 is greater than threshold 2, includes all or a part of PSSCH resources indicated by the other second SCI in the second resource set. The above description is given by taking two pieces of second SCI as examples, and processing modes for one or more cases are similar to what described above, which shall not be enumerated herein any further.

In some embodiments, if the measurement result is less than the threshold, it means that all or a part of the PSSCH resources indicated by the second SCI indicating the third reception priority are recommended resources, i.e. resources that may be taken into account when the first UE determines the first candidate resource set, and the second resource set is a recommended resource set, and if the measurement result is greater than the threshold, it means that all or a part of the PSSCH resources indicated by the second SCI indicating the third reception priority are resources that are not recommended (possibly occupied resources), i.e. resources needing to be excluded when the first UE determines the first candidate resource set, and the second resource set is an excluded resource set.

In some embodiments, the resources indicated by the second SCI include PSSCH resources in the same time unit as current SCI, and/or reserved PSSCH resources to which retransmission corresponds and/or reserved PSSCH resources for transmitting a next period (applied to a scenario of periodic transmission).

In some embodiments, the assistance information may be periodically transmitted, semi-persistently transmitted or aperiodically transmitted. After the second UE receives the first SCI, according to the indication information in the first SCI, it determines such parameters as a resource for transmitting the assistance information, a delay demand and a transmission priority of the assistance information, etc., and transmits the assistance information according to the parameters.

In some embodiments, the transmission priority of the assistance information may be the first transmission priority, and the first transmission priority may be indicated by the first SCI. After the first transmission priority is learnt, i.e. the transmission priority of the assistance information is determined, for example, the second UE may transmit the assistance information, and the SCI on the related PSCCH thereto may indicate the transmission priority of the assistance information.

In some embodiments, the method may further include (optional, not shown in figures): the second UE transmits the assistance information to a fourth UE, and the fourth UE forwards the assistance information to the first UE, which shall be described later in an embodiments of a seventh aspect.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment does not determine the resource set sensed in the assistance information according to the priority of the data to be transmitted by the terminal equipment itself, but determines the resource set sensed in the assistance information according to the priority of the data transmitted by the peer terminal equipment determining transmission data resources by using the assistance information. Hence, the resource set sensed in the assistance information may be determined by taking the services transmitted by the peer terminal equipment into account, so that the assistance information may more efficiently assist the peer terminal equipment in transmitting services.

Embodiments of a Second Aspect

The embodiments of this disclosure provide a resource determination method, which shall be described from a side of a first terminal equipment (hereinafter referred to as a first UE for convenience), with repeated parts identical to those in the embodiment of the first aspect being not going to be described herein any further.

FIG. 5 is a schematic diagram of the resource determination method of the embodiment of this disclosure. As shown in FIG. 5, the method includes:

501: the first UE receives assistance information transmitted by a second UE; wherein the assistance information includes time frequency domain information of resources in a second resource set, the second resource set being determined by the second UE according to a first transmission priority, the first transmission priority being determined according a priority of first sidelink data transmitted by the first UE; and

502: the first UE determines a first candidate resource set for transmitting the first sidelink data, according to the second resource set.

In some embodiments, reference may be made to the embodiments of the first aspect for particular implementations of the assistance information, the second resource set, the first transmission priority and the transmission priority of the first SL data, and 501 corresponds to 301-302 in the embodiments of the first aspect, which shall not repeated herein any further.

In some embodiments, when the second resource set contains recommended resources, the first UE may take the resources in the second resource set into account in determining the first candidate resource set, that is, the resources in the second resource set may be used as the first candidate resources; and when the second resource set contains excluded resources, the first UE does not take the second resource set into account in determining the first candidate resource set, that is, the resources in the second resource set will not be taken as the first candidate resources.

In some embodiments, the method may further include (optional, not shown in figures): the first UE selects a first resource from the first candidate resource set, and transmits the first SL data on the first resource. Reference may be made to relevant technologies, which shall not be repeated herein any further.

In some embodiments, the first UE may transmit the first SL data by broadcast, or may transmit the first SL data by multicast, or may transmit the first SL data by unicast, may transmit the first SL data to the second UE, or may transmit the first SL data to other UEs, and this embodiment is not limited thereto.

It can be seen from the above embodiment that the terminal equipment does not determine the resource set sensed in the assistance information according to the priority of the data to be transmitted by the terminal equipment itself, but determines the resource set sensed in the assistance information according to the priority of the data transmitted by the peer terminal equipment determining transmission data resources by using the assistance information. Hence, the resource set sensed in the assistance information may be determined by taking the services transmitted by the peer terminal equipment into account, so that the assistance information may more efficiently assist the peer terminal equipment in transmitting services.

In LTE V2X and NR V2X, in addition to needing to take the priority of the data to be transmitted of the current UE itself into account in the above-described resource sensing detection process, the priority of the data to be transmitted of the current UE itself needs also to be taken into account in a process of transmitting data/information, the processing including but being not limited to determining a resource for transmitting data/information, congestion control, power control, and determining a priority of transmitting the data/information. The embodiments of this disclosure provide an information transmission scheme, that is, in performing processing of transmitting assistance information to a peer terminal equipment, a priority of a sidelink to be transmitted of the terminal equipment is not used, but the processing of transmitting assistance information to the peer terminal equipment is determined according to a priority of the data transmitted by the peer terminal equipment determining a resource for transmitting data by using the assistance information. Hence, the processing of transmitting the assistance information to the peer terminal equipment may be performed by taking the services transmitted by the peer terminal equipment into account, so that the assistance information may more efficiently assist the peer terminal equipment in transmitting services, which shall be described below with reference to embodiments of a third aspect.

Embodiments of the Third Aspect

The embodiments of this disclosure provide an information transmission method, which shall be described from a side of a second terminal equipment (hereinafter referred to as a second UE for convenience).

FIG. 6 is a schematic diagram of the information transmission method of the embodiment of this disclosure. As shown in FIG. 6, the method includes:

601: the second UE performs processing related to transmitting assistance information to a first UE, according to a first transmission priority, wherein the assistance information is used by the first UE for determining a first candidate resource set for transmitting first sidelink data, and the first transmission priority is determined according to a priority of the first sidelink data transmitted by the first UE; and

602: the second UE transmits the assistance information to the first UE, or not transmits the assistance information, or performs power reduction on transmission of the assistance information, according to a result of processing.

It should be noted that FIG. 6 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 6.

In some embodiments, reference may be made to the embodiments of the first aspect for particular implementations of the assistance information, the first transmission priority and the transmission priority of the first SL data, which shall not be repeated herein any further.

In some embodiments, the processing related to transmitting the assistance information includes but is not limited to determining a resource for transmitting the assistance information, congestion control in transmitting the assistance information, power reduction in transmitting the assistance information, and determining a priority of transmitting the assistance information, which shall be described below respectively.

In some embodiments, the processing is determining the transmission priority of the assistance information. In 601-602, the transmission priority of the assistance information is determined according to the first transmission priority. For example, it is determined that the transmission priority of the assistance information is the first transmission priority, and the second UE transmits the assistance information to the first UE according to the first transmission priority.

In some embodiments, the processing is determining the resource for transmitting the assistance information, including determining a fourth candidate resource set and selecting resource from the fourth candidate resource set for transmitting the assistance information, and reference may be made to the process of sensing detection+resource selection. FIG. 7 is a schematic diagram of the resource determination method. As shown in FIG. 7, the method includes:

701: the second UE detects third SCI and measures reference signals to which a PSCCH or PSSCH corresponding to the third sidelink control information corresponds to obtain an RSRP measurement result; wherein reference may be made to operation 401 in the embodiments of the first aspect for the processing, and a meaning of the third SCI is identical to that of the second SCI, which shall not be described herein any further;

702: the second UE determines an RSRP threshold; wherein the RSRP threshold is determined according to the first transmission priority or a second transmission priority and a third reception priority indicated by the detected third SCI, the second transmission priority being equal to a higher priority of the first transmission priority and the transmission priority of the assistance information;

in some embodiments, for example, each measured RSRP corresponds to an RSRP threshold $Th(p_t, p_r)$; where, $p_t$ is the first transmission priority or the second transmission priority, but not a transmission priority of sidelink data to be transmitted of the second UE itself indicated by a higher layer; $p_r$ is a fourth reception priority indicated by the third SCI received by the terminal equipment; and $(p_t, p_r)$ corresponds to a threshold $Th(p_t, p_r)$, and the correspondence may be configured by a network side, preconfigured or predefined, and reference may be made to relevant technologies for details;

703: the RSRP measurement result is compared with the RSRP threshold, and determining a fourth candidate resource set according to a comparison result;

in some embodiments, a physical layer of the second UE obtains a granularity $R_{x,y}$ of resource selection from a higher layer (such as a media access control (MAC) layer); reference may be made to existing technologies for a meaning of the granularity; and a set of $R_{x,y}$-sized resources (hereinafter referred to as $R_{x,y}$ candidate resources) in all time units in an entire selection window is initialized and defined as set A; the second UE may exclude a part of candidate resources in set A to obtain a the fourth candidate resource according to a result of detection performed in the sensing window before transmitting the assistance information. For example, following $R_{x,y}$ candidate resources need to be excluded: an $R_{x,y}$ candidate resource in a time unit detected by the terminal equipment in the sensing window, wherein it is detected on the $R_{x,y}$ candidate resource that the third SCI indicating the third reception priority reserves a corresponding time unit within a current selection window, indicated frequency domain resource overlaps with the $R_{x,y}$ candidate resource in a frequency domain and the RSRP measurement result is greater than the RSRP threshold, or, the third SCI indicating the third reception priority reserves a time unit after the selection window, the time unit is the same time unit in a time domain as a time unit in subsequent time units possibly reserved by time units in the current selection window, a frequency domain resource overlaps with the $R_{x,y}$ candidate resource in the frequency domain and the RSRP measurement result is greater than the RSRP threshold $Th(p_t, p_r)$;

704: the physical layer of the terminal equipment reports the fourth candidate resource set to the MAC layer, and the MAC layer performs random selection on the fourth candidate resource set to select a candidate resource for transmitting the assistance information.

In some embodiments, based on a capability of the terminal equipment, it is determined that a time of the resource for transmitting the assistance information is a parameter Tproc,1', and the parameter value is greater than a time parameter Tproc,1 determining the resource for transmission the non-assistance information. For example, compensation may be performed, such as Tproc,1'=Tproc,1+X; where, X may be 1, 2 . . . , and a unit is a time unit, and values of X may be different for different subcarrier spacings, for example, the larger the subcarrier spacing, the larger X is.

In some embodiments, the processing is congestion control in transmitting the assistance information. In 601-602, congestion control is performed according to the first transmission priority or the second transmission priority and a channel busy ratio value obtained in current measurement; wherein the second transmission priority is equal to a higher priority of the first transmission priority and the transmission priority of the assistance information; and the second UE determines to transmit the assistance information to the first UE or not to transmit the assistance information according to a result of the congestion control. FIG. 8 is a schematic diagram of a method of congestion control. As shown in FIG. 8, the method includes:

801: a channel occupancy ratio threshold is determined corresponding to the first transmission priority or the second transmission priority and the channel busy ratio value that is obtained by current measurement;

in some embodiments, the channel occupancy ratio threshold $CR_{Limit}(k)$ is obtained by looking up a table, such as predefining or preconfiguring a correspondence between priorities and at least one first table, and determining a first mapping table corresponding to the first transmission priority or the second transmission priority k from the at least one first table; a channel occupancy ratio threshold is determined according to the channel busy ratio value CBR obtained by the current measurement and the first mapping table; the first mapping table includes a correspondence between the priorities, the CBR and the channel occupancy ratio threshold, the channel occupancy ratio threshold is determined according the first/second transmission priority(priorities) and the CBR obtained through calculation, and the CBR is a ratio of subchannels in subchannels detected within a predetermined period of time with received signal strength indicators greater than the RSRP threshold (configured by a higher layer or preconfigured) to all subchannels;

802: congestion control is performed according to the channel occupancy ratio threshold;

in some embodiments, when the second UE transmits the assistance information, it is taken into account that the transmission priority of the assistance information needs to ensure that the transmission of the assistance information is able to satisfy a limit of the channel occupancy ratio, that is, the following formula (1) is satisfied:

$$\Sigma_{i \geq k} CR(i) \leq CR_{Limit}(k);$$

where, CR (i) denotes a ratio of the number of subchannels occupied by services corresponding to priority i to the number of configured subchannels within a predetermined period of time. If formula (1) is satisfied, the assistance information may be transmitted. And if formula (1) is not satisfied, a data packet to which the assistance information corresponds may be dropped at a current time unit and is not transmitted.

In some embodiments, the method may further include:

803 (optional): the second UE receives resource pool configuration information, the resource pool configuration information including second indication information, the second indication information being used to indicate whether to transmit assistance information.

Furthermore, in 602, the second UE determines to transmit the assistance information to the first UE or not to transmit the assistance information according to the result of the congestion control and the second indication information. When both the congestion control and the second indication information determine to transmit the assistance information, the assistance information is transmitted, and when at least one of the congestion control and the second indication information determines not to transmit the assistance information, the assistance information is not transmitted.

FIG. 9 is a schematic diagram of a congestion control method. As shown in FIG. 9, the method includes:

901: a second mapping table is determined corresponding to the first transmission priority or the second transmission priority from at least one second table;

in some embodiments, a correspondence between at least one second table and priorities is predefined or preconfigured, the second mapping table is determined according to the first/second transmission priority/priorities; the second mapping table includes a correspondence between different CBRs and the first indication information; for example, for a first CBR range, it indicates transmitting the assistance information ON, and for a second CBR range, it indicates not transmitting the assistance information OFF;

902: first indication information is determined indicating whether to transmit the assistance information according to the channel busy ratio value obtained by current measurement and the second mapping table.

In some embodiments, the second mapping table may be looked up according to the CBR obtained by current measurement to determine whether to transmit the assistance information. If a corresponding first indication is ON, the assistance information will be transmitted; otherwise, the assistance information will not be transmitted. Alternatively, if the corresponding first indication is OFF, the second UE may ignore the first SCI transmitted by the first UE.

In some embodiments, the processing is dropping the assistance information or power reduction in transmitting the assistance information. In steps 601-602, when transmission of the assistance information or transmission of information related to the assistance information temporally overlaps with transmission or reception of other information, whether to drop the assistance information and/or the information related to the assistance information is determined, or whether to perform power reduction on the transmission of the assistance information and/or the information related to the assistance information is determined according to a result of comparison of the first transmission priority or the second transmission priority with transmission or reception priority of the other information, wherein the second transmission priority is equal to a higher priority of the first transmission priority and the transmission priority of the assistance information. For example, when the first/second transmission priority/priorities is/are lower than the transmission priority of the other information, the assistance information is dropped, or the transmission power of the assistance information is reduced. In some embodiments, the transmission of the assistance information or the transmission of the information related to the assistance information includes at least one of transmission of a PSSCH of the assistance information, transmission of a PSFCH carrying feedback information corresponding to the assistance information and transmission of a PUCCH carrying the feedback information corresponding to the assistance information; and the transmission or reception of the other information includes at least one of transmission or reception an SL using LTE wireless access, transmission of uplink data and transmission or reception of a PSFCH carrying other feedback information.

For example, when the transmission of the assistance information using NR wireless access or the transmission of the information related to the assistance information temporally overlaps with the transmission or reception of the SL using LTE wireless access, those with higher priorities are transmitted or received. For example, when the first/second transmission priority/priorities is/are higher than the transmission or reception priority of the SL using LTE wireless access, the transmission of the assistance information or the transmission of the information related to the assistance information is performed.

For example, if the transmission of the PSSCH of the assistance information overlaps with transmission of other uplink data, the one with a higher transmission priority is transmitted and the other is dropped (simultaneous transmission of an uplink (UL) and an SL is supported), or the one with a higher transmission priority is transmitted and transmission power of the one with a lower priority is reduced (simultaneous transmission of an uplink (UL) and an SL is not supported), so that the total transmission power does not exceed a maximum power requirement. The dropping or power reduction may be determined according to a capability of the UE, and this disclosure is not limited thereto.

For example, when the transmission of the PSFCH carrying the feedback information of the assistance information overlaps with the transmission of other uplink data, it is further needed to determine whether the corresponding PUCCH or PUSCH is configured with priority 1 and whether a corresponding priority of a PSSCH with a highest priority in the PSFCH is higher than a threshold, and determines whether to transmit the PSFCH or the other uplink data according to a determination result.

For example, if the transmission of the PSFCH carrying the feedback information of the assistance information overlaps with reception of other PSFCHs, a PSFCH with a higher priority will be selected for transmission or reception. For example, when the first/second transmission priority/priorities is/are higher than priorities of the other PSFCHs, the PSFCH is transmitted.

For example, if the transmission of the PSFCH carrying the feedback information of the assistance information overlaps with the transmission of the other PSFCHs, when power is limited (that is, the sum of transmission power of all PSFCHs is greater than maximum transmission power of the terminal equipment), N (greater than or equal to 2) PSFCHs with higher priorities are select for transmission. For example, when the first/second transmission priority/priorities is/are higher than priorities of the other PSFCHs, the assistance information is transmitted, and when the first/second transmission priority/priorities is/are lower than transmission priorities of other N PCFCHs, the assistance information is dropped.

For example, if the transmission of the PUCCH carrying the feedback information of the assistance information overlaps with transmission of other sidelink data, the one with a higher priority is transmitted, and the other is dropped.

Scenarios of overlapping shall not be enumerated herein any further, and reference may be made to section 16.2.4 of 3GPP standard TS38.2.1.3.

It can be seen from the above embodiments that in performing processing of transmitting the assistance information to the peer terminal equipment, the priority of the sidelink to be transmitted of the terminal equipment is not used, but performing processing of transmitting the assistance information to the peer terminal equipment is determined according to the priority of the data transmitted by the peer terminal equipment determining the resource for transmitting data by using the assistance information. Hence, the services transmitted by the peer terminal equipment may be taken into account to perform the processing of transmitting the assistance information to the peer terminal equipment, so that the assistance information may more effectively assist the peer terminal equipment in transmitting services.

Embodiments of a Fourth Aspect

The embodiments of this disclosure provide an information transmission method, which shall be described from a side of a second terminal equipment (hereinafter referred to as a second UE for the convenience of description). What is different from the embodiments of the first aspect is that a first transmission priority is configured by a higher layer or is preconfigured, rather than determined according to the priority of the first sidelink data transmitted by the first UE, with repeated parts identical to those in the embodiments of the first aspect being not going to be described herein any further.

In some embodiments, the first transmission priority may be configured in resource pool configuration, or may be configured in radio resource control signaling, or may be preconfigured, thereby solving a problem of how to generate the assistance information in a scenario where no triggering signaling (such as SCI) triggers transmission of the assistance information.

Embodiments of a Fifth Aspect

The embodiments of this disclosure provide a resource determination method, which shall be described from a side of a first terminal equipment (hereinafter referred to as a first UE for the convenience of description). What is different from the embodiments of the second aspect is that a first transmission priority is configured by a higher layer or is preconfigured, rather than determined according to the priority of the first sidelink data transmitted by the first UE, with repeated parts identical to those in the embodiment of the second aspect being not going to be described herein any further.

In some embodiments, the first transmission priority may be configured in resource pool configuration, or may be configured in radio resource control signaling, or may be preconfigured, thereby solving a problem of how to generate the assistance information in a scenario where no triggering signaling (such as SCI) triggers transmission of the assistance information.

Embodiments of a Sixth Aspect

The embodiments of this disclosure provide a resource determination method, which shall be described from a side of a second terminal equipment (hereinafter referred to as a second UE for convenience of description). What is different from the embodiments of the third aspect is that a first transmission priority is configured by a higher layer or is preconfigured, rather than determined according to the priority of the first sidelink data transmitted by the first UE, with repeated parts identical to those in the embodiments of the third aspect being not going to be described herein any further.

In some embodiments, the first transmission priority may be configured in resource pool configuration, or may be configured in radio resource control signaling, or may be preconfigured, thereby solving a problem of how to transmit assistance information to a peer terminal equipment in a scenario where no triggering signaling (such as SCI) triggers transmission of the assistance information.

Embodiments of a Seventh Aspect

The embodiments of this disclosure provide an information transmission method, which shall be described from a side of a fourth terminal equipment (hereinafter referred to as a fourth UE for the convenience of description). Since a link channel is in bad condition or a first UE is transmitting (transmission and reception conflicts are occurred due to that the sidelink UE is half-duplex), the first UE does not receive the assistance information transmitted by the second UE. Therefore, in order to improve reliability, the assistance information may be forwarded by means of a fourth UE, that is, the second UE may further transmit the assistance information to the fourth UE, and the fourth UE forwards the assistance information to the first UE.

FIG. 10 is a schematic diagram of the information transmission method. As shown in FIG. 10, the method includes:

1001: the fourth UE receives the assistance information transmitted by the second UE, wherein the assistance information includes time-frequency domain information of resources in a second resource set, the second resource set being determined by the second UE according to a first transmission priority, the first transmission priority being determined according to a priority of first sidelink data transmitted by the first UE; and

1002: the fourth UE transmits the assistance information to the first UE.

In some embodiments, reference may be made to the embodiments of the first aspect for particular implementations of the assistance information, the second resource set, the first transmission priority and the transmission priority of the first LS data, and reference may be made to 501 for 1001, which shall not be repeated herein any further.

It can be seen from the above embodiments that when the first UE does not receive the assistance information, the assistance information may be forwarded by means of the fourth, thereby improving reliability.

Embodiments of an Eighth Aspect

The embodiments of this disclosure provide an information transmission apparatus. The apparatus may be, for example, a terminal equipment, or may be one or more components or assemblies configured in a terminal equipment, with contents identical to those in the embodiments of the first aspect being not going to be described herein any further.

FIG. 11 is a schematic diagram of the information transmission apparatus of the embodiment of this disclosure. As shown in FIG. 11, the information transmission apparatus 1100 includes:

a first determining unit 1101 configured to determine a second resource set according to a first transmission priority; and a first transmitting unit 1102 configured to transmit assistance information to a first UE, the assistance information including time frequency domain information of resources in the second resource set, and the second resource set being used by the first UE for determining a first candidate resource set for transmitting first sidelink data, wherein the first transmission priority is determined according to a priority of the first sidelink data transmitted by the first UE.

In some embodiments, reference may be made to the embodiments of the first aspect for particular implementations of the assistance information, the second resource set, the first SL data, the first transmission priority and the transmission priority of the first SL data, and implementations of the first determining unit 1101 and the first transmitting unit 1102 correspond to 301-302 in the embodiment of the first aspect, which shall not be repeated herein any further.

In some embodiments, the first transmitting unit 1102 may further be configured to transmit the assistance information to the third UE, and the second resource set is further used for the third UE to determine a third candidate resource set for transmitting third SL data, and the first transmission priority is equal to a higher priority of the transmission priority of the first SL data and the transmission priority of the third SL data.

In some embodiments, the first transmitting unit 1102 may further be configured to transmit the assistance information to the fourth UE, a fifth UE, and so on, and the first transmission priority is equal to a highest priority in transmission priorities of respective SL data of UEs receiving and using/referring to the assistance information, which shall not be repeated herein any further.

In some embodiments, the apparatus may further include (optional, not shown in figures):

a first receiving unit configured to receive first SCI transmitted by the first UE, the first SCI being used to indicate a priority of the first sidelink data transmitted by the first UE, and reference may be made to the embodiment of the first aspect for implementation thereof, which shall not be repeated herein any further.

In some embodiments, the first SCI may further be used to trigger transmission of the assistance information, and the transmission priority of the assistance information may be the first transmission priority.

Figure 12:
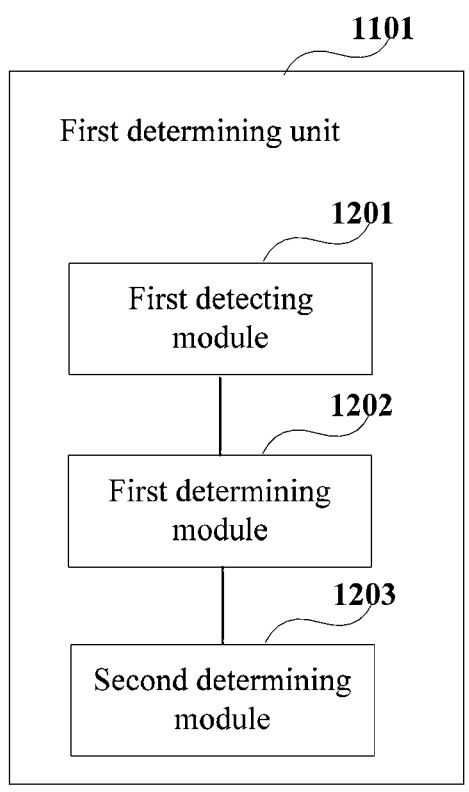
FIG. 12 is a schematic diagram of the first determining unit 1101 of the embodiment of this disclosure.

In some embodiments, the first determining unit 1101 determines the second resource set according to the first transmission priority in a process of sensing detection. For example, the first determining unit 1101 determines whether a part or all of PSSCH resources indicated by second SCI indicating a third reception priority are contained in the second resource set according to the first transmission priority and the third reception priority. FIG. 12 is a schematic diagram of a structure of the first determining unit 1101. As shown in FIG. 12, the first determining unit 1101 includes:

a first detecting module 1201 configured to detect second sidelink control information and measure a reference signal to which a PSCCH or PSSCH corresponding to the second sidelink control information corresponds to obtain an RSRP measurement result;

a first determining module 1202 configured to determine an RSRP threshold according to the first transmission priority and the third reception priority indicated by the detected second SCI; and a second determining module 1203 configured to compare the RSRP measurement result with the RSRP threshold, and contain all or a part of PSSCH resources indicated by the second SCI indicating the third reception priority in the second resource set when the second SCI is detected and a measurement result of the reference signal to which a PSCCH or PSSCH corresponding to the second sidelink control information corresponds is greater than the threshold, or contain all or a part of PSSCH resources indicated by the second SCI indicating the third reception priority in the second resource set when the second SCI is detected and a measurement result of the reference signal to which a PSCCH or PSSCH corresponding to the detected second SCI corresponds is less than the threshold.

In some embodiments, reference may be made to 401-403 in the embodiments of the first aspect for implementations of the first detecting module 1201, the first determining module 1202 and the second determining module 1203, which shall not be repeated here any further.

In some embodiments, the first transmitting unit 1102 may further transmit the assistance information to a fourth UE, and the fourth UE forwards the assistance information to the first UE.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the information transmission apparatus 1100 may further include other components or modules, and reference may be made to related techniques for particulars of these components or modules.

Furthermore, for the sake of simplicity, connection relationships between the components or modules or signal profiles thereof are only illustrated in FIG. 11. However, it should be understood by those skilled in the art that such related techniques as bus connection, etc., may be adopted.

And the above components or modules may be implemented by hardware, such as a processor, a memory, a transmitter, and a receiver, etc., which are not limited in the embodiment of this disclosure.

It can be seen from the above embodiments that the terminal equipment does not determine the resource set sensed in the assistance information according to the priority of the data to be transmitted by the terminal equipment itself, but determines the resource set sensed in the assistance information according to the priority of the data transmitted by the peer terminal equipment determining transmission data resources by using the assistance information. Hence, the resource set sensed in the assistance information may be determined by taking the services transmitted by the peer terminal equipment into account, so that the assistance information may more efficiently assist the peer terminal equipment in transmitting services.

Embodiments of a Ninth Aspect

The embodiments of this disclosure provide a resource determination apparatus. The apparatus may be, for example, a terminal equipment, or may be one or more components or assemblies configured in a terminal equipment, with contents identical to those in the embodiments of the second aspect being not going to be described herein any further.

Figure 19:
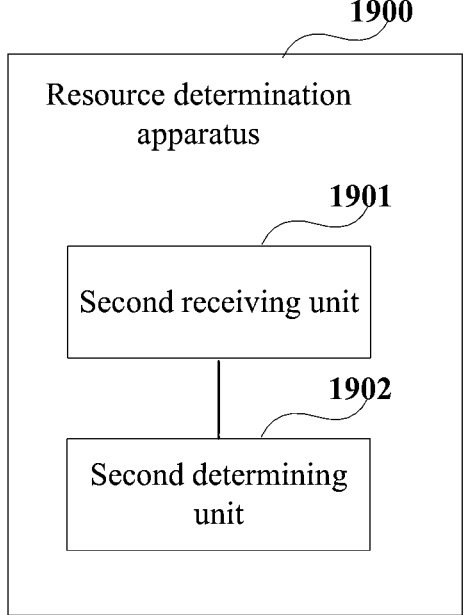
FIG. 19 is a schematic diagram of the resource determination apparatus of an embodiment of this disclosure.

FIG. 19 is a schematic diagram of the resource determination apparatus of the embodiment of this disclosure. As shown in FIG. 19, the resource determination apparatus 1900 includes:

a second receiving unit 1901 configured to receive assistance information transmitted by a second UE; wherein the assistance information includes time frequency domain information of resources in a second resource set, the second resource set being determined by the second UE according to a first transmission priority, the first transmission priority being determined according a priority of first sidelink data transmitted by the first UE; and a second determining unit 1902 configured to, according to the second resource set, a first candidate resource set for transmitting the first sidelink data.

In some embodiments, reference may be made to the embodiments of the first aspect for particular implementations of the assistance information, the second resource set, the first transmission priority and the transmission priority of the first SL data, and the second receiving unit 1901 and the second determining unit 1902 correspond to 501-502 in the embodiments of the second aspect, which shall not be repeated herein any further.

In some embodiments, the second determining unit 1902 may further select a resource for transmitting the first SL data from the first candidate resource set, and the apparatus may further include (optional, not shown in figures) a third transmitting unit configured to transmit the first SL data. The third transmitting unit may transmit the first SL data by broadcast, or may transmit the first SL data by multicast, or may transmit the first SL data by unicast, or may transmit the first SL data to the second UE, or may transmit the first SL data to other UEs, and this embodiment is not limited thereto.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the information transmission apparatus 1900 may further include other components or modules, and reference may be made to related techniques for particulars of these components or modules.

Furthermore, for the sake of simplicity, connection relationships between the components or modules or signal profiles thereof are only illustrated in FIG. 19. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiment that the terminal equipment does not determine the resource set sensed in the assistance information according to the priority of the data to be transmitted by the terminal equipment itself, but determines the resource set sensed in the assistance information according to the priority of the data transmitted by the peer terminal equipment determining transmission data resources by using the assistance information. Hence, the resource set sensed in the assistance information may be determined by taking the services transmitted by the peer terminal equipment into account, so that the assistance information may more efficiently assist the peer terminal equipment in transmitting services.

Embodiments of a Tenth Aspect

The embodiments of this disclosure provide an information transmission apparatus. The apparatus may be, for example, a terminal equipment, or may be one or more components or assemblies configured in a terminal equipment, with contents identical to those in the embodiments of the third aspect being not going to be described herein any further.

Figure 13:
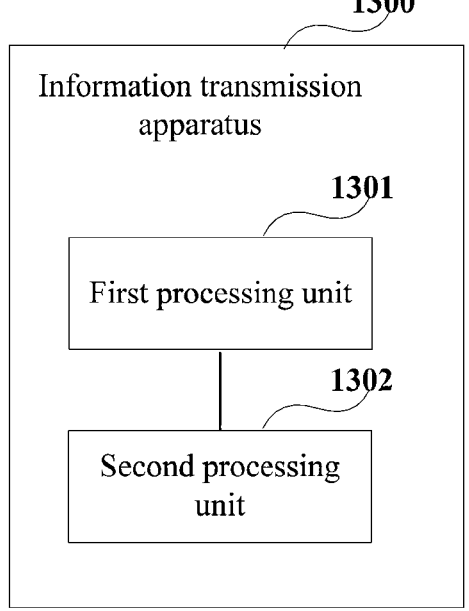
FIG. 13 is another schematic diagram of the information transmission apparatus of the embodiment of this disclosure.

FIG. 13 is a schematic diagram of the information transmission apparatus of the embodiment of this disclosure. As shown in FIG. 13, the information transmission apparatus 1300 includes:

a first processing unit 1301 configured to perform processing related to transmitting assistance information to a first UE according to a first transmission priority, wherein the assistance information is used by the first UE for determining a first candidate resource set for transmitting first sidelink data, and the first transmission priority is determined according a priority of the first sidelink data transmitted by the first UE; and a second processing unit 1302 configured to transmit the assistance information to the first UE, or not to transmit the assistance information, or perform power reduction on transmission of the assistance information, according to a result of processing.

In some embodiments, reference may be made to the embodiments of the first aspect for particular implementations of the assistance information, the first transmission priority and the transmission priority of the first SL data, and the first processing unit 1301 and the second processing unit 1302 correspond to 601-602, which shall not be repeated herein any further.

In some embodiments, the processing related to transmitting the assistance information includes but is not limited to determining a resource for transmitting the assistance information, congestion control in transmitting the assistance information, power control in transmitting the assistance information and determining a priority of transmitting the assistance information, which shall be respectively described below.

In some embodiments, the processing is determining the transmission priority of the assistance information, and the first processing unit 1301 determines the transmission priority of the assistance information according to the first transmission priority. For example, it is determined that the transmission priority of the assistance information is the first transmission priority, and the second processing unit 1302 transmits the assistance information to the first UE according to the first transmission priority.

Figure 14:
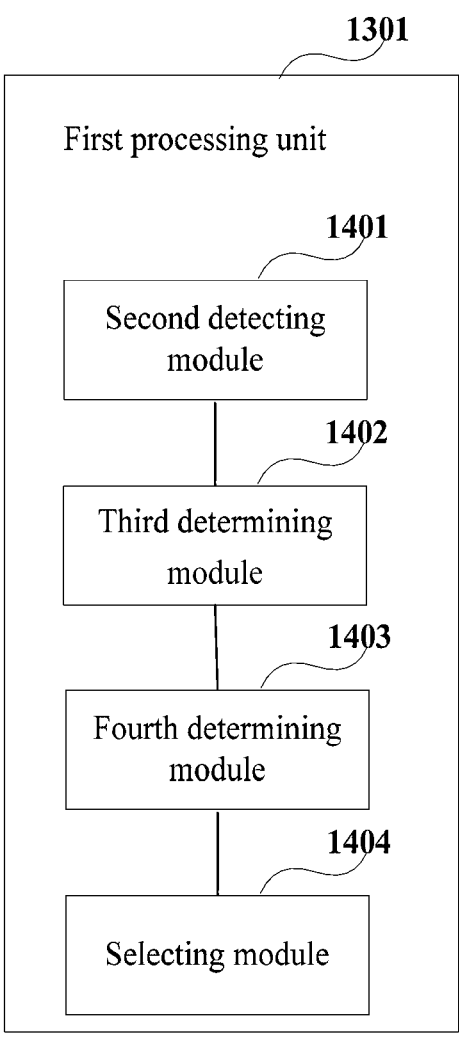
FIG. 14 is a schematic diagram of the first processing unit 1301 of the embodiment of this disclosure.

In some embodiments, the processing is determining the resource for transmitting the assistance information, including determining a fourth candidate resource set and resource selected from the fourth candidate resource set for transmitting the assistance information, and reference may be made to the process of sensing detection+resource selection. FIG. 14 is a schematic diagram of the first processing unit 1301 in the embodiment of this disclosure. As shown in FIG. 14, the first processing unit 1301 includes:

a second detecting module 1401 configured to detect third SCI and measure a reference signal to which a PSCCH or PSSCH corresponding to the third SCI corresponds to obtain an RSRP measurement result; reference may be made to operation 401 in the embodiments of the first aspect for processing thereof, and a meaning of the third SCI is identical to that of the second SCI, which shall not be described herein any further;

a third determining module 1402 configured to determine an RSRP threshold according to the first transmission priority or a second transmission priority and a third reception priority indicated by the detected third SCI, the second transmission priority being a higher priority of the first transmission priority and the transmission priority of the assistance information;

a fourth determining module 1403 configured to compare the RSRP measurement result with the RSRP threshold, and determine a fourth candidate resource set according to a comparison result; and a selecting module 1404 configured to report the fourth candidate resource set from a physical layer to an MAC layer, the MAC layer performing random selection on the fourth candidate resource set to select a candidate resource for transmitting the assistance information.

Reference may be made to 701-704 in the embodiments of the third aspect for the processing of the second detecting module 1401, the third determining module 1402, the fourth determining module 1403 and the selecting module 1404, which shall not be repeated herein any further.

Figure 15:
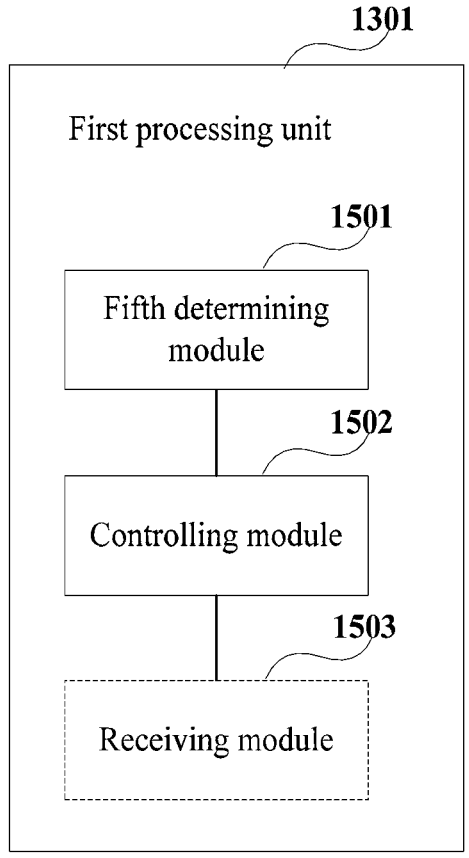
FIG. 15 is a schematic diagram of the first processing unit 1301 of the embodiment of this disclosure.

In some embodiments, the processing is congestion control in transmitting the assistance information. The first processing unit 1301 performs congestion control according to the first transmission priority or the second transmission priority and a channel busy ratio value obtained in current measurement; wherein the second transmission priority is equal to a higher priority of the first transmission priority and the transmission priority of the assistance information; and the second transmitting unit 1302 determines to transmit the assistance information to the first UE or not to transmit the assistance information according to a result of the congestion control. FIG. 15 is a schematic diagram of a structure of the first processing unit 1301 of the embodiment of this disclosure. As shown in FIG. 15, the first processing unit 1301 includes:

a fifth determining module 1501 configured to determine a channel occupancy ratio threshold corresponding to the first transmission priority or the second transmission priority and the channel busy ratio value that is obtained by current measurement;

a controlling module 1502 configured to perform congestion control according to the channel occupancy ratio threshold; and a receiving module 1503 configured to receive resource pool configuration information, the resource pool configuration information including second indication information, the second indication information being used for indicating whether to transmit the assistance information.

The fifth determining module 1501, the controlling module 1502 and the receiving module 1503 correspond to 801-803 in the embodiment of the third aspect, which shall not described herein any further.

Furthermore, the second processing unit 1302 determines whether to transmit the assistance information to the first UE or not to transmit the assistance information according to a result of the congestion control and the second indication information. When both the congestion control and the second indication information determine to transmit the assistance information, the second processing unit 1302 transmits the assistance information, and when at least one of the congestion control and the second indication information determines not to transmit the assistance information, the second processing unit 1302 does not transmit the assistance information.

Figure 16:
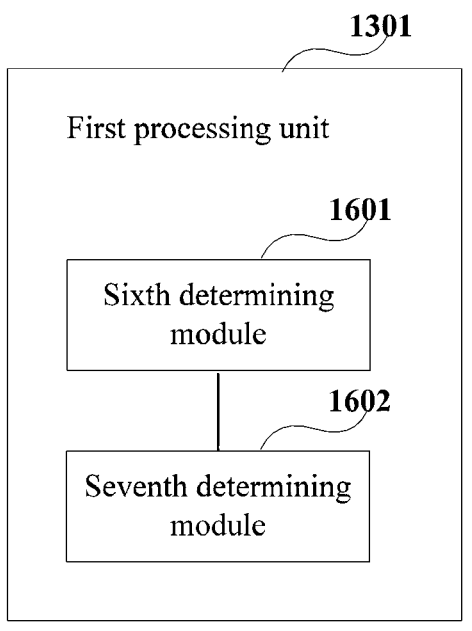
FIG. 16 is a schematic diagram of the first processing unit 1301 of the embodiment of this disclosure.

FIG. 16 is another schematic diagram of the structure of the first processing unit 1301 of the embodiment of this disclosure. As shown in FIG. 16, the first processing unit 1301 includes:

a sixth determining module 1601 configured to determine a second mapping table corresponding to the first transmission priority or the second transmission priority from at least one second table; and a seventh determining module 1602 configured to determine first indication information indicating whether to transmit the assistance information according to the channel busy ratio value that is obtained by current measurement and the second mapping table.

The sixth determining module 1601 and the seventh determining module 1602 correspond to 901-902 in the embodiments of the third aspect, which shall not be repeated herein any further.

In some embodiments, the processing is dropping the assistance information or power reduction in transmitting the assistance information, and when transmission of the assistance information or transmission or reception of information related to the assistance information temporally overlaps with transmission or reception of other information, the first processing unit 1301 determines whether to drop the assistance information and/or the information related to the assistance information, or whether to perform power reduction on the transmission of the assistance information and/or the information related to the assistance information according to a result of comparison of the first transmission priority or the second transmission priority with transmission priority of the other information, wherein the second transmission priority is equal to a higher priority in the first transmission priority and the transmission priority of the assistance information. For example, when the first/second transmission priority/priorities is/are lower than the transmission priority of the other information, the second processing unit 1302 drops the assistance information, or reduces the transmission power of the assistance information.

In some embodiments, the transmission of the assistance information or the transmission of the information related to the assistance information includes at least one of transmission of a PSSCH of the assistance information, transmission of a PSFCH carrying feedback information corresponding to the assistance information and transmission of a PUCCH carrying the feedback information corresponding to the assistance information; and the transmission or reception of the other information includes at least one of transmission or reception an SL using LTE wireless access, transmission of uplink data and transmission or reception of a PSFCH carrying other feedback information.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the information transmission apparatus 1300 may further include other components or modules, and reference may be made to related techniques for particulars of these components or modules.

Furthermore, for the sake of simplicity, connection relationships between the components or modules or signal profiles thereof are only illustrated in FIG. 13. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that in performing processing of transmitting the assistance information to the peer terminal equipment, the priority of the sidelink to be transmitted of the terminal equipment is not used, but performing processing of transmitting the assistance information to the peer terminal equipment is determined according to the priority of the data transmitted by the peer terminal equipment determining the resource for transmitting data by using the assistance information. Hence, the services transmitted by the peer terminal equipment may be taken into account to perform the processing of transmitting the assistance information to the peer terminal equipment, so that the assistance information may more effectively assist the peer terminal equipment in transmitting services.

The embodiments of the first aspect and the third aspect may be implemented separately or in a combined manner, and the embodiments of this disclosure are not limited thereto.

The embodiments of the eighth aspect and the tenth aspect may be implemented separately or in a combined manner, and the embodiments of this disclosure are not limited thereto.

Embodiments of an Eleventh Aspect

The embodiments of this disclosure provide an information transmission apparatus, with a difference from the embodiments of the eighth aspect being that the first transmission priority is configured by a higher layer or is preconfigured, rather than being determined according to the priority of first sidelink data transmitted by the first UE.

Repeated parts identical to those in the embodiment of the eighth aspect shall not be repeated herein any further.

In some embodiments, the first transmission priority may be configured in resource pool configuration, or may be configured in radio resource control signaling, or may be preconfigured, thereby solving a problem of how to generate the assistance information in a scenario where no triggering signaling (such as SCI) triggers transmission of the assistance information.

Embodiments of a Twelfth Aspect

The embodiments of this disclosure provide a resource determination method, with a difference from the embodiments of the ninth aspect being that the first transmission priority is configured by a higher layer or is preconfigured, rather than being determined according to the priority of the first sidelink data transmitted by the first UE. Repeated parts identical to those in the embodiment of the ninth aspect shall not be repeated herein any further.

In some embodiments, the first transmission priority may be configured in resource pool configuration, or may be configured in radio resource control signaling, or may be preconfigured, thereby solving a problem of how to generate the assistance information in a scenario where no triggering signaling (such as SCI) triggers transmission of the assistance information.

Embodiments of a Thirteenth Aspect

The embodiments of this disclosure provide an information transmission method, with a difference from the embodiments of the tenth aspect being that the first transmission priority is configured by a higher layer or is preconfigured, rather than being determined according to the priority of the first sidelink data transmitted by the first UE. Repeated parts identical to those in the embodiment of the tenth aspect shall not be repeated herein any further.

In some embodiments, the first transmission priority may be configured in resource pool configuration, or may be configured in radio resource control signaling, or may be preconfigured, thereby solving a problem of processing of how to transmit assistance information to a peer terminal equipment in a scenario where no triggering signaling (such as SCI) triggers transmission of the assistance information.

Embodiments of a Fourteenth Aspect

The embodiments of this disclosure provide an information transmission apparatus. The apparatus may be, for example, a terminal equipment, or may be one or more components or assemblies configured in a terminal equipment, with contents identical to those in the embodiment of the seven aspect being not going to be described herein any further.

Figure 17:
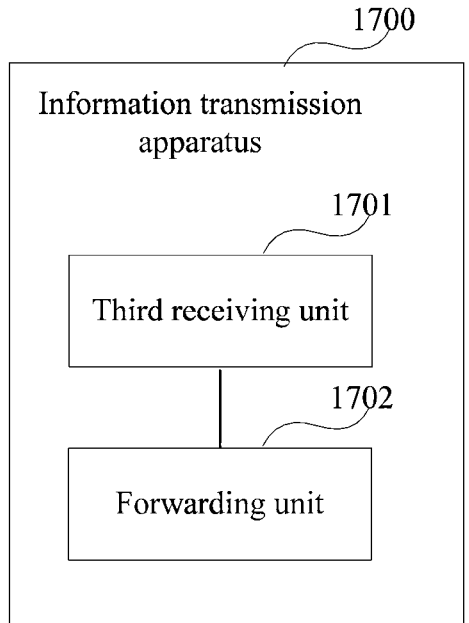
FIG. 17 is another schematic diagram of the information transmission apparatus of the embodiment of this disclosure.

FIG. 17 is a schematic diagram of the information transmission apparatus of the embodiment of this disclosure. As shown in FIG. 17, the information transmission apparatus 1700 includes:

a third receiving unit 1701 configured to receive assistance information transmitted by a second UE; wherein the assistance information includes time-frequency domain information of resources in a second resource set, the second resource set being determined by the second UE according to a first transmission priority, the first transmission priority being determined according to a priority of the first sidelink data transmitted by the first UE; and a forwarding unit 1702 configured to forward the assistance information to the first UE.

In some embodiments, reference may be made to the embodiments of the first aspect for implementations of the assistance information, the second resource set, the first transmission priority and the transmission priority of the first SL data, and reference may be made to 1001-1002 in the seventh aspect for the third receiving unit 1701 and the forwarding unit 1702, with repeated parts being not going to be described herein any further.

It can be seen from the above embodiment that when the first UE is busy and is unable to receive the assistance information, the assistance information is forwarded by means of the fourth UE, thereby improving the reliability.

Embodiments of a Fifteenth Aspect

The embodiments of this disclosure provide a communication system, and reference may be made to FIG. 1, with contents identical to those in the embodiments of the first to the fourteenth aspects being not going to be described herein any further. The communication system 100 may at least include a second UE 102 and a first UE 103.

In some embodiments, the second UE 102 determines a second resource set according to a first transmission priority, transmits assistance information to a first UE, the assistance information including time frequency domain information of resources in the second resource set, and the second resource set being used by the first UE for determining a first candidate resource set for transmitting first sidelink (SL) data, and the first transmission priority being determined according to a priority of the first sidelink data transmitted by the first UE; and the first UE 103 receives the assistance information, and determines the first candidate resource set for transmitting the second sidelink data according to the second resource set.

In some embodiments, according to the first transmission priority, the second UE 102 performs processing related to transmission of the assistance information to the first UE 103, and according to a result of the processing, transmits the assistance information to the first UE 103, or does not transmit the assistance information, or performs power reduction on the transmission of the assistance information.

Alternatively, the communication system 100 may further include a fourth UE 104.

In some embodiments, the second UE 102 may further transmit the assistance information to the fourth UE 104, the fourth UE 104 forwards the assistance information to the first UE 103, and the first UE 103 may further select a resource from the first candidate resource set to transmit the first SL data, such as by broadcast, or multicast or unicast, for example, it may transmit the assistance information to the second UE 102; however, this embodiment is not limited thereto.

In some embodiments, the first priority may be configured by a higher layer, or may be preconfigured.

The embodiment of this disclosure further provides a terminal equipment; however, this disclosure is not limited thereto, and it may also be another equipment.

Figure 18:
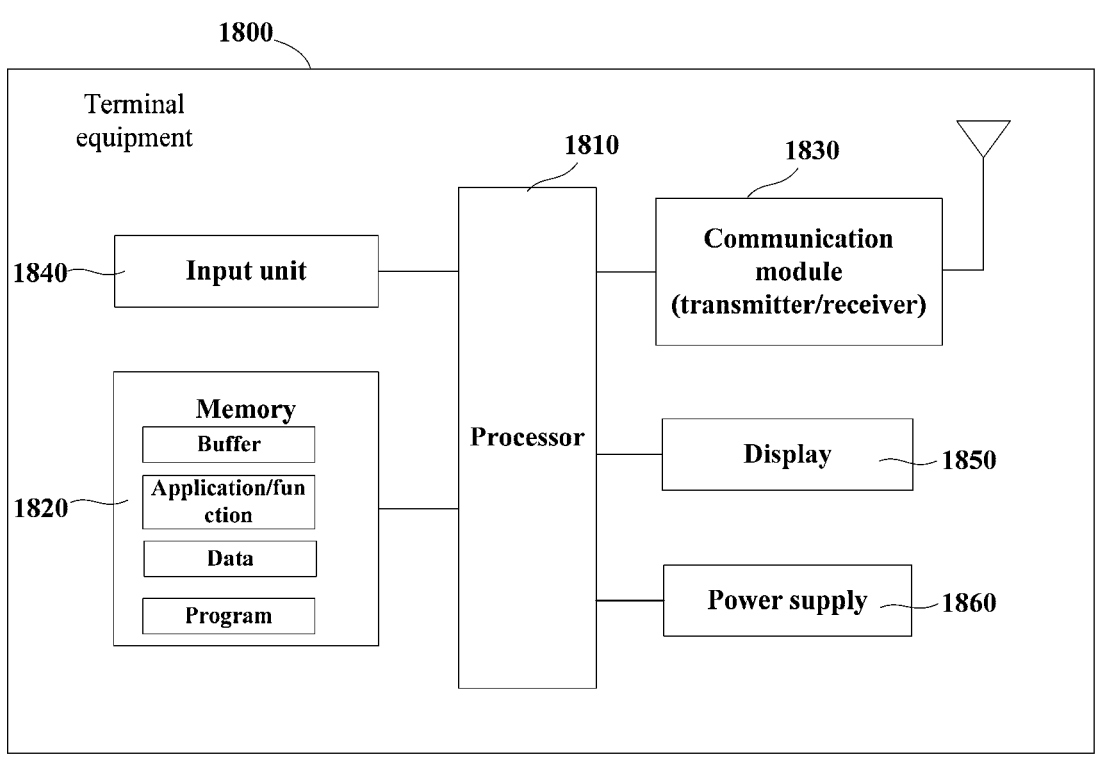
FIG. 18 is a schematic diagram of the terminal equipment of an embodiment of this disclosure.

FIG. 18 is a schematic diagram of the terminal equipment of the embodiment of this disclosure. As shown in FIG. 18, the terminal equipment 1800 may include a processor 1810 and a memory 1820, the memory 1820 storing data and a program and being coupled to the processor 1810. It should be noted that this figure is illustrative only, and other types of structures may also be used, so as to supplement or replace this structure and achieve a telecommunications function or other functions.

For example, the processor 1810 may be configured to execute a program to carry out the information transmission methods/resource determination methods as described in the embodiments of the first to seventh aspects. For example, the processor 1810 is applicable to a second UE, and may be configured to perform the following control: determining a second resource set according to a first transmission priority; and transmitting assistance information to a first UE, the assistance information including time frequency domain information of resources in the second resource set, and the second resource set being used by the first UE for determining a first candidate resource set for transmitting first sidelink (SL) data, wherein the first transmission priority is determined according to a priority of the first sidelink data transmitted by the first UE.

For example, the processor 1810 is applicable to a first UE, and may be configured to perform the following control: receiving assistance information transmitted by a second UE; wherein the assistance information includes time frequency domain information of resources in a second resource set, the second resource set being determined by the second UE according to a first transmission priority, the first transmission priority being determined according a priority of first sidelink data transmitted by the first UE; and according to the second resource set, determining a first candidate resource set for transmitting the first sidelink data.

For example, the processor 1810 is applicable to a second UE, and may be configured to perform the following control: performing processing related to transmitting assistance information to a first UE according to a first transmission priority, wherein the assistance information is used by the first UE for determining a first candidate resource set for transmitting first sidelink data, and the first transmission priority is determined according to a priority of the first sidelink data transmitted by the first UE; and according to a result of processing, transmitting the assistance information to the first UE, or not transmitting the assistance information, or performing power reduction on transmission of the assistance information.

For example, the processor 1810 is applicable to a fourth UE, and may be configured to perform the following control: receiving assistance information transmitted by a second UE, wherein the assistance information includes time-frequency domain information of resources in a second resource set, the second resource set being determined by the second UE according to a first transmission priority, the first transmission priority being determined according to a priority of first sidelink data transmitted by the first UE; and transmitting the assistance information to the first UE.

In some embodiments, the above first transmission priority may also be configured by a higher layer, or may be preconfigured.

As shown in FIG. 18, the terminal equipment 1800 may further include a communication module 1830, an input unit 1840, a display 1850, and a power supply 1860; wherein functions of the above components are similar to those in the prior art, which shall not be described herein any further. It should be noted that the terminal equipment 1800 does not necessarily include all the parts shown in FIG. 18, and the above components are not necessary. Furthermore, the terminal equipment 1800 may include parts not shown in FIG. 18, and the prior art may be referred to.

An embodiment of this disclosure provides a computer program, which, when executed in a terminal equipment, will cause the terminal equipment to carry out the information transmission method as described in the embodiments of the first and the third to seventh aspects.

An embodiment of this disclosure provides a storage medium, including a computer program, which will cause a terminal equipment to carry out the information transmission method as described in the embodiments of the first and the third to seventh aspects.

An embodiment of this disclosure provides a computer program, which, when executed in a terminal equipment, will cause the terminal equipment to carry out the resource determination method as described in the embodiment of the second aspect.

An embodiment of this disclosure provides a storage medium, including a computer program, which will cause a terminal equipment to carry out the resource determination method as described in the embodiment of the second aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

As to implementations containing the above embodiments, following supplements are further disclosed.

1. An information transmission method, applicable to a second UE, wherein the method includes:

determining a second resource set by the second UE according to a first transmission priority; and transmitting assistance information by the second UE to a first UE, the assistance information including time frequency domain information of resources in the second resource set, and the second resource set being used by the first UE for determining a first candidate resource set for transmitting first sidelink data; wherein the first transmission priority is determined according to a priority of the first sidelink data transmitted by the first UE.

2. The method according to supplement 1, wherein the second UE determines the second resource set by using sensing detection.

3. The method according to supplement 1 or 2, wherein the first transmission priority is a priority of the first sidelink data transmitted by the first UE, or the method further includes:

transmitting the assistance information by the second UE to a third UE, the second resource set being further used by the third UE to determine a third candidate resource set for transmitting third sidelink data; wherein the first transmission priority is a higher priority of the transmission priority of the first sidelink data transmitted by the first UE and a transmission priority of the third sidelink data transmitted by the third UE.

4. The method according to any one of supplements 1-3, wherein the method further includes: receiving, by the second UE, first sidelink control information transmitted by the first UE, the first sidelink control information being used to indicate a priority of the first sidelink data transmitted by the first UE.

5. The method according to supplement 4, wherein, the first sidelink control information is further used to trigger transmission of the assistance information.

6. The method according to any one of supplements 1-5, wherein the determining a second resource set by the second UE according to a first transmission priority includes: determining whether a all or a part of PSSCH resources indicated by second SCI indicating a third reception priority are contained in the second resource set according to the first transmission priority and the third reception priority, including steps of:

detecting second sidelink control information and measuring a reference signal to which a PSCCH or PSSCH corresponding to the second sidelink control information corresponds to obtain an RSRP measurement result;

determining an RSRP threshold of a measurement resource according to the first transmission priority and the third reception priority indicated by the detected second SCI; and comparing the RSRP measurement result with the RSRP threshold, and contain all or a part of PSSCH resources indicated by the second SCI indicating the third reception priority in the second resource set when the second SCI is detected and a measurement result of the reference signal to which a PSCCH or PSSCH corresponding to the second sidelink control information corresponds is greater than the threshold, or contain all or a part of PSSCH resources indicated by the second SCI indicating the third reception priority in the second resource set when the second SCI is detected and a measurement result of the reference signal to which a PSCCH or PSSCH corresponding to the detected second SCI corresponds is less than the threshold.

7. The method according to any one of supplements 1-6, wherein a transmission priority of the assistance information is the first transmission priority.

8. The method according to any one of supplements 1-7, wherein transmission of the first SL data includes initial transmission or retransmission.

9. A resource determination method, applicable to a second UE, wherein the method includes:

receiving, by the first UE, assistance information transmitted by a second UE; wherein the assistance information includes time frequency domain information of resources in a second resource set, the second resource set being determined by the second UE according to a first transmission priority, the first transmission priority being determined according a priority of first sidelink data transmitted by the first UE; and determining by the first UE according to the second resource set, a first candidate resource set for transmitting the first sidelink data.

10. An information transmission method, applicable to a second UE, wherein the method includes:

performing processing related to transmitting assistance information to a first UE, by the second UE according to a first transmission priority, wherein the assistance information is used by the first UE for determining a first candidate resource set for transmitting first sidelink data, and the first transmission priority is determined according to a priority of the first sidelink data transmitted by the first UE; and transmitting the assistance information to the first UE, or not transmitting the assistance information, or performing power reduction on transmission of the assistance information, by the second UE according to a result of processing.

11. The method according to supplement 10, wherein the assistance information includes time frequency domain information of resources in a second resource set.

12. The method according to supplement 10 or 11, wherein the first transmission priority is a priority of the first sidelink data transmitted by the first UE, or the method further includes:

transmitting the assistance information to a third UE by the second UE, the second resource set being further used by the third UE for determining a third candidate resource set for transmitting third sidelink data, wherein the first transmission priority is a higher priority of the priority of the first sidelink data transmitted by the first UE and a priority of the third sidelink data transmitted by the third UE.

13. The method according to any one of supplements 10-12, wherein the method further includes:

receiving by the second UE, first sidelink control information transmitted by the first UE, the first sidelink control information being used to indicate a priority of the first sidelink data transmitted by the first UE.

14. The method according to supplement 13, wherein, the first sidelink control information is further used to trigger transmission of the assistance information.

15. The method according to any one of supplements 10-14, wherein the performing processing according to a first transmission priority includes:

determining that a transmission priority of the assistance information is the first transmission priority; and transmitting the assistance information by the second UE to the first UE according to the first transmission priority.

16. The method according to any one of supplements 10-14, wherein the performing processing according to a first transmission priority includes:

determining a resource for transmitting the assistance information, including:

detecting third sidelink control information and measuring a reference signal to which a PSCCH or PSSCH corresponding to the third sidelink control information corresponds to obtain an RSRP measurement result;

determining an RSRP threshold of a measurement resource according to the first transmission priority or a second transmission priority and a fourth reception priority indicated by the detected third SCI, the second transmission priority being a higher priority of the first transmission priority and the transmission priority of the assistance information;

comparing the RSRP measurement result with the RSRP threshold, determining a fourth candidate resource set according to a comparison result; and selecting the resource from the fourth candidate resource set;

and transmitting the assistance information by the second UE to the first UE on the resource.

17. The method according to any one of supplements 10-14, wherein the performing processing according to a first transmission priority includes:

performing congestion control according to the first transmission priority or the second transmission priority and a channel busy ratio value that is obtained by current measurement; wherein the second transmission priority is a higher priority of the first transmission priority and the transmission priority of the assistance information; and determining according to a result of congestion control by the second UE to transmit the assistance information to the first UE, or not to transmit the assistance information.

18. The apparatus according to supplement 17, wherein the performing congestion control according to the first transmission priority or the second transmission priority and a channel busy ratio value that is obtained by current measurement includes:

determining a channel occupancy ratio threshold corresponding to the first transmission priority or the second transmission priority and the channel busy ratio value that is obtained by current measurement; and performing congestion control according to the channel occupancy ratio threshold;

wherein the determining a channel occupancy ratio threshold includes:

determining a first mapping table corresponding to the first transmission priority or the second transmission priority from at least one first table; and determining the channel occupancy ratio threshold according to the channel busy ratio value that is obtained by current measurement and the first mapping table.

19. The apparatus according to supplement 17, wherein the performing congestion control according to the first transmission priority or the second transmission priority and a channel busy ratio value that is obtained by current measurement includes:

determining a second mapping table corresponding to the first transmission priority or the second transmission priority from at least one second table; and determining first indication information indicating whether to transmit the assistance information according to the channel busy ratio value that is obtained by current measurement and the second mapping table.

20. The method according to supplement 18, wherein the method further includes:

receiving resource pool configuration information by the second UE, the resource pool configuration information including second indication information, the second indication information being used for indicating whether to transmit the assistance information; and determining by the second UE according to the result of congestion control and the second indication information to transmit the assistance information to the first UE, or not to transmit the assistance information.

21. The method according to any one of supplements 10-14, wherein the performing processing according to a first transmission priority includes:

when the transmission of the assistance information or transmission of information related to the assistance information temporally overlaps transmission or reception of other information, according to a result of comparison of the first transmission priority or the second transmission priority with a priority of the transmission or reception of other information, determining whether to drop the assistance information and/or the information related to the assistance information, or determining whether to perform power reduction on the transmission of the assistance information and/or the information related to the assistance information, wherein the second transmission priority is a higher priority of the first transmission priority and the transmission priority of the assistance information.

22. The method according to supplement 21, wherein the transmission of the assistance information or the transmission of the information related to the assistance information includes at least one of transmission of a PSSCH of the assistance information, transmission of a PSFCH carrying feedback information corresponding to the assistance information, and transmission of a PUCCH carrying feedback information corresponding to the assistance information; and the transmission or reception of the other information includes at least one of SL transmission or reception using LTE wireless access, transmission of uplink data, and transmission or reception of a PSFCH carrying other feedback information.

23. The method according to supplement 16, wherein the method further includes:

compensating for a time parameter needed in determining the resource, wherein a compensation value is related to an SCS, the larger the subcarrier spacing, the larger the compensation value is.

24. An information transmission method, applicable to a second UE, wherein the method includes:

determining a second resource set by the second UE according to a first transmission priority configured by a higher layer or preconfigured; and transmitting assistance information by the second UE to a first UE, the assistance information including time frequency domain information of resources in the second resource set, and the second resource set being used by the first UE for determining a first candidate resource set for transmitting first sidelink data.

25. A resource determination method, applicable to a first UE, wherein the method includes:

receiving, by the first UE, assistance information transmitted by a second UE, the assistance information including time frequency domain information of resources in a second resource set, the second resource set being determined by the second UE according to a first transmission priority configured by a higher layer or preconfigured; and determining, by the first UE according to the second resource set, a first candidate resource set for transmitting first sidelink data.

26. An information transmission method, applicable to a second UE, wherein the method includes:

performing processing related to transmitting assistance information to a first UE, by the second UE according to a first transmission priority configured by a higher layer or preconfigured, wherein the assistance information is used by the first UE for determining a first candidate resource set for transmitting first sidelink data; and determining to transmit the assistance information to the first UE, or not to transmit the assistance information, or perform power reduction on transmission of the assistance information, by the second UE according to a result of processing.

27. An information transmission method, applicable to a second UE, wherein the method includes:

determining a second resource set by the second UE according to a first transmission priority; and transmitting assistance information by the second UE to a fourth UE, the assistance information including time frequency domain information of resources in the second resource set, and the second resource set being used by a first UE for determining a first candidate resource set for transmitting first sidelink data, wherein the first transmission priority is determined according to a priority of the first sidelink data transmitted by the first UE.

28. An information transmission method, applicable to a fourth UE, wherein the method includes:

receiving, by the fourth UE, assistance information transmitted by a second UE, wherein the assistance information includes time frequency domain information of resources in a second resource set, the second resource set being determined by the second UE according to a first transmission priority, the first transmission priority being determined according to a priority of first sidelink data transmitted by the first UE; and transmitting the assistance information by the fourth UE to the first UE.

29. A terminal equipment, including a memory and a processor, the memory storing a computer program, and the processor being configured to execute the computer program to carry out the information transmission method as described in any one of supplements 1-9, 11-24 and 26-28 or the resource determination method as described in supplement 10 or 25.

30. An information transmission apparatus, applicable to a second UE, wherein the apparatus includes:

a first determining unit configured to determine a second resource set according to a first transmission priority; and a first transmitting unit configured to transmit assistance information to a first UE, the assistance information including time frequency domain information of resources in the second resource set, and the second resource set being used by the first UE for determining a first candidate resource set for transmitting first sidelink data, wherein the first transmission priority is determined according to a priority of the first sidelink data transmitted by the first UE.

31. The apparatus according to supplement 30, wherein the first determining unit determines the second resource set by using sensing detection.

32. The apparatus according to supplement 30 or 31, wherein the first transmission priority is a priority of the first sidelink data transmitted by the first UE, or the first transmitting unit is further configured to transmit the assistance information to a third UE, and the second resource set is further used by the third UE for determining a third candidate resource set for transmitting third sidelink data, wherein the first transmission priority is a higher priority of the priority of the first sidelink data transmitted by the first UE and a priority of the third sidelink data transmitted by the third UE.

33. The apparatus according to any one of supplements 30-32, wherein the apparatus further includes:

a first receiving unit configured to receive first sidelink control information transmitted by the first UE, the first sidelink control information being used to indicate a priority of the first sidelink data transmitted by the first UE, and/or, the first sidelink control information being further used to trigger transmission of the assistance information.

34. The apparatus according to any one of supplements 30-33, wherein a transmission priority of the assistance information is the first transmission priority.

35. The apparatus according to any one of supplements 30-34, wherein the first determining unit determines whether a part or all of PSSCH resources indicated by second SCI indicating a third reception priority are contained in the second resource set according to the first transmission priority and the third reception priority, and the first determining unit includes:

a first detecting module configured to detect second sidelink control information and measure a reference signal to which a PSCCH or PSSCH corresponding to the second sidelink control information corresponds to obtain an RSRP measurement result;

a first determining module configured to determine an RSRP threshold of a measurement resource according to the first transmission priority and the third reception priority indicated by the detected second SCI; and a second determining module configured to compare the RSRP measurement result with the RSRP threshold, and contain all or a part of PSSCH resources indicated by the second SCI indicating the third reception priority in the second resource set when the second SCI is detected and a measurement result of the reference signal to which a PSCCH or PSSCH corresponding to the second sidelink control information corresponds is greater than the threshold, or contain all or a part of PSSCH resources indicated by the second SCI indicating the third reception priority in the second resource set when the second SCI is detected and a measurement result of the reference signal to which a PSCCH or PSSCH corresponding to the detected second SCI corresponds is less than the threshold.

36. A resource determination apparatus, applicable to a first UE, wherein the apparatus includes:

a first receiving unit configured to receive assistance information transmitted by a second UE; wherein the assistance information includes time frequency domain information of resources in a second resource set, the second resource set being determined by the second UE according to a first transmission priority, the first transmission priority being determined according a priority of first sidelink data transmitted by the first UE; and a second determining unit configured to, according to the second resource set, determine a first candidate resource set for transmitting the first sidelink data.

37. An information transmission apparatus, applicable to a second UE, the apparatus including:

a first processing unit configured to perform processing related to transmitting assistance information to a first UE according to a first transmission priority, wherein the assistance information is used by the first UE for determining a first candidate resource set for transmitting first sidelink data, and the first transmission priority is determined according a priority of the first sidelink data transmitted by the first UE; and a second processing unit configured to transmit the assistance information to the first UE, or not to transmit the assistance information, or perform power reduction on transmission of the assistance information, according to a result of processing.

38. The apparatus according to supplement 37, wherein the assistance information includes time frequency domain information of resources in the second resource set.

39. The apparatus according to supplement 37 or 38, wherein the first transmission priority is a priority of the first sidelink data transmitted by the first UE, or the apparatus further includes:

a second transmitting unit configured to transmit the assistance information to a third UE, and the second resource set is further used by the third UE for determining a third candidate resource set for transmitting third sidelink data, wherein the first transmission priority is a higher priority of the priority of the first sidelink data transmitted by the first UE and a priority of the third sidelink data transmitted by the third UE.

40. The apparatus according to any of supplements 37-39, wherein the apparatus further includes:

a second receiving unit configured to receive first sidelink control information transmitted by the first UE, the first sidelink control information being used to indicate a priority of the first sidelink data transmitted by the first UE, and/or, the first sidelink control information being further used to trigger transmission of the assistance information.

41. The apparatus according to any of supplements 37-40, wherein the first processing unit determines that a transmission priority of the assistance information is the first transmission priority, and the second processing unit transmits the assistance information to the first UE according to the first transmission priority.

42. The apparatus according to supplement 37, wherein the first processing unit is configured to determine a resource for transmitting the assistance information, and the first processing unit includes:

a second detecting module configured to detect third sidelink control information and measure a reference signal to which a PSCCH or PSSCH corresponding to the third sidelink control information corresponds to obtain an RSRP measurement result;

a third determining module configured to determine an RSRP threshold of a measurement resource according to the first transmission priority or a second transmission priority and a fourth reception priority indicated by the detected third SCI, the second transmission priority being a higher priority of the first transmission priority and the transmission priority of the assistance information;

a fourth determining module configured to compare the RSRP measurement result with the RSRP threshold, and determine a fourth candidate resource set according to a comparison result; and a selecting module configured to select the resource from the fourth candidate resource set;

and the second processing unit transmits the assistance information to the first UE on the resource.

43. The apparatus according to supplement 37, wherein the first processing unit performs congestion control according to the first transmission priority or the second transmission priority and a channel busy ratio value that is obtained by current measurement; wherein the second transmission priority is a higher priority of the first transmission priority and the transmission priority of the assistance information;

and the second processing unit determines according to a result of congestion control to transmit the assistance information to the first UE, or not to transmit the assistance information.

44. The apparatus according to supplement 43, wherein the first processing unit includes:

a fifth determining module configured to determine a channel occupancy ratio threshold corresponding to the first transmission priority or the second transmission priority and the channel busy ratio value that is obtained by current measurement; and a controlling module configured to perform congestion control according to the channel occupancy ratio threshold;

wherein the fifth determining module determines a first mapping table corresponding to the first transmission priority or the second transmission priority from at least one first table, and determines the channel occupancy ratio threshold according to the channel busy ratio value that is obtained by current measurement and the first mapping table.

45. The apparatus according to supplement 43, wherein the first processing unit includes:

a sixth determining module configured to determine a second mapping table corresponding to the first transmission priority or the second transmission priority from at least one second table; and a seventh determining module configured to determine first indication information indicating whether to transmit the assistance information according to the channel busy ratio value that is obtained by current measurement and the second mapping table.

46. The apparatus according to supplement 44, wherein the apparatus further includes:

a receiving module configured to receive resource pool configuration information, the resource pool configuration information including second indication information, the second indication information being used for indicating whether to transmit the assistance information;

and the second processing unit determines according to the result of congestion control and the second indication information to transmit the assistance information to the first UE, or not to transmit the assistance information.

47. The apparatus according to supplement 37, wherein when the transmission of the assistance information or transmission of information related to the assistance information temporally overlaps transmission or reception of other information, the first processing unit, according to a result of comparison of the first transmission priority or the second transmission priority with a priority of the transmission or reception of other information, determines whether to drop the assistance information and/or the information related to the assistance information, or determines whether to perform power reduction on the transmission of the assistance information and/or the information related to the assistance information, wherein the second transmission priority is a higher priority of the first transmission priority and the transmission priority of the assistance information.

48. The apparatus according to supplement 47, wherein the transmission of the assistance information or the transmission of the information related to the assistance information includes at least one of transmission of a PSSCH of the assistance information, transmission of a PSFCH carrying feedback information corresponding to the assistance information, and transmission of a PUCCH carrying feedback information corresponding to the assistance information; and the transmission or reception of the other information includes at least one of SL transmission or reception using LTE wireless access, transmission of uplink data, and transmission or reception of a PSFCH carrying other feedback information.

49. The apparatus according to supplement 42, wherein the apparatus further includes:

a compensating unit configured to compensate for a time parameter needed in determining the resource, wherein a compensation value is related to a subcarrier spacing, the larger the subcarrier spacing, the larger the compensation value is.

What is claimed is:

1. An information transmission apparatus, applicable to a second UE, wherein the apparatus comprises:

a receiver configured to receive first sidelink control information transmitted by a first terminal equipment (UE), the first sidelink control information indicating a priority of first sidelink data transmitted by the first terminal equipment, the first sidelink control information being configured to trigger transmission of assistance information, wherein a transmission priority of the assistance information is pre-configured;

processor circuitry configured to:

determine a first transmission priority according to the priority of first sidelink data transmitted by the first terminal equipment, and determine a second resource set according to the first transmission priority; and a transmitter configured to transmit the assistance information to the first UE, the assistance information including time frequency domain information of resources in the second resource set, the second resource set being used by the first UE for determining a first candidate resource set for transmitting first sidelink data.

2. The apparatus according to claim 1, wherein the processor circuitry is further configured to determine the second resource set by using sensing detection.

3. The apparatus according to claim 1, wherein the first transmission priority is a priority of the first sidelink data transmitted by the first UE, or the transmitter is further configured to transmit the assistance information to a third UE, and the second resource set is further used by the third UE for determining a third candidate resource set for transmitting third sidelink data, wherein the first transmission priority is a higher priority of the priority of the first sidelink data transmitted by the first UE and a priority of the third sidelink data transmitted by the third UE.

4. The apparatus according to claim 1, wherein the processor circuitry is further configured to determine whether a part or all of PSSCH resources indicated by second SCI indicating a third reception priority are contained in the second resource set according to the first transmission priority and the third reception priority, and the processor circuitry is further configured to:

detect the second sidelink control information and measure a reference signal to which a PSCCH or PSSCH corresponding to the second sidelink control information corresponds to obtain an RSRP measurement result;

determine an RSRP threshold of a measurement resource according to the first transmission priority and the third reception priority indicated by the detected second SCI, and compare the RSRP measurement result with the RSRP threshold, and contain all or a part of PSSCH resources indicated by the second SCI indicating the third reception priority in the second resource set when the second SCI is detected and a measurement result of the reference signal to which a PSCCH or PSSCH corresponding to the second sidelink control information corresponds is greater than the threshold, or contain all or a part of PSSCH resources indicated by the second SCI indicating the third reception priority in the second resource set when the second SCI is detected and a measurement result of the reference signal to which a PSCCH or PSSCH corresponding to the detected second SCI corresponds is less than the threshold.

5. A resource determination apparatus, applicable to a first UE, wherein the apparatus comprises:

a transmitter configured to transmit first sidelink control information to a second terminal equipment (UE), the first sidelink control information being indicating a priority of first sidelink data transmitted by the first terminal equipment, the first sidelink control information being configured to trigger transmission of assistance information, wherein a transmission priority of the assistance information is pre-configured;

a receiver configured to receive the assistance information transmitted by the second UE; wherein the assistance information including time frequency domain information of resources in a second resource set, the second resource set being determined by the second UE according to a first transmission priority, the first transmission priority being determined according to a priority of first sidelink data transmitted by the first UE; and processor circuitry configured to, according to the second resource set, determine a first candidate resource set for transmitting the first sidelink data.

\* \* \* \* \*